US009896554B2

(12) United States Patent
Deshpande

(10) Patent No.: US 9,896,554 B2
(45) Date of Patent: Feb. 20, 2018

(54) COLORANT COMPATIBLE OXYGEN SCAVENGING POLYMER COMPOSITIONS AND ARTICLES MADE FROM SAME

(75) Inventor: Girish N. Deshpande, Bolingbrook, IL (US)

(73) Assignee: PLASTIPAK PACKAGING, INC., Plymouth, MI (US)

(*) Notice: Subject to any disclaimer, the term of this patent is extended or adjusted under 35 U.S.C. 154(b) by 52 days.

(21) Appl. No.: 12/893,817

(22) Filed: Sep. 29, 2010

(65) Prior Publication Data

US 2011/0123741 A1 May 26, 2011

Related U.S. Application Data

(60) Provisional application No. 61/246,956, filed on Sep. 29, 2009.

(51) Int. Cl.
| | | |
|---|---|---|
| C08J 5/18 | (2006.01) | |
| B29C 49/00 | (2006.01) | |
| C08L 67/02 | (2006.01) | |
| B65D 6/00 | (2006.01) | |
| B29C 49/04 | (2006.01) | |
| B29C 49/06 | (2006.01) | |
| B29C 51/00 | (2006.01) | |
| C08K 3/00 | (2018.01) | |
| C08K 5/00 | (2006.01) | |
| C08K 5/098 | (2006.01) | |
| C08K 5/101 | (2006.01) | |
| C08K 5/20 | (2006.01) | |
| C08L 77/06 | (2006.01) | |

(52) U.S. Cl.
CPC ............. *C08J 5/18* (2013.01); *B29C 49/0005* (2013.01); *C08L 67/02* (2013.01); *B29C 49/0047* (2013.01); *B29C 49/04* (2013.01); *B29C 49/06* (2013.01); *B29C 51/002* (2013.01); *B65D 11/00* (2013.01); *C08J 2367/02* (2013.01); *C08K 3/0033* (2013.01); *C08K 5/0041* (2013.01); *C08K 5/098* (2013.01); *C08K 5/101* (2013.01); *C08K 5/20* (2013.01); *C08L 77/06* (2013.01); *Y10T 428/1352* (2015.01)

(58) Field of Classification Search
USPC ........ 524/94; 525/437; 428/35.7; 264/328.1, 264/523; 546/113; 548/460
See application file for complete search history.

(56) References Cited

U.S. PATENT DOCUMENTS

| 2,841,591 A | 7/1958 | Prichard |
|---|---|---|
| 3,317,558 A | 5/1967 | Becke et al. |
| 3,322,785 A | 5/1967 | Henry |
| 4,536,409 A | 8/1985 | Farrell et al. |
| 4,786,671 A | 11/1988 | Kress et al. |
| 5,021,515 A | 6/1991 | Cochran et al. |
| 5,049,624 A | 9/1991 | Adams et al. |
| 5,075,362 A | 12/1991 | Hofeldt et al. |
| 5,116,547 A * | 5/1992 | Tsukahara ................. B29B 7/94 264/1.1 |
| 5,211,875 A | 5/1993 | Speer et al. |
| 5,250,592 A | 10/1993 | Nesvadba |
| 5,639,815 A | 6/1997 | Cochran et al. |
| 5,955,527 A | 9/1999 | Cochran et al. |
| 6,261,749 B1 * | 7/2001 | Asami ................. G03C 7/3041 430/505 |
| 6,610,234 B2 | 8/2003 | Akkapeddi et al. |
| 6,780,916 B2 | 8/2004 | Tung et al. |
| 7,879,930 B2 * | 2/2011 | Liu ................................ 524/87 |
| 7,994,245 B2 | 8/2011 | Deshpande et al. |
| 8,431,721 B2 | 4/2013 | Deshpande et al. |
| 8,450,398 B2 | 5/2013 | Deshpande |
| 8,748,519 B2 | 6/2014 | Deshpande |
| 8,975,345 B2 | 3/2015 | Deshpande |
| 9,181,414 B2 | 11/2015 | Deshpande |
| 9,222,020 B2 | 12/2015 | Deshpande |
| 9,475,630 B2 | 10/2016 | Deshpande et al. |
| 2003/0109643 A1 | 6/2003 | Ching et al. |
| 2004/0241468 A1 | 12/2004 | Otaki |
| 2006/0069197 A1 | 3/2006 | Tammaji et al. |
| 2006/0180790 A1 * | 8/2006 | Deshpande et al. ..... 252/188.28 |
| 2006/0182911 A1 | 8/2006 | Tammajl et al. |
| 2006/0247388 A1 | 11/2006 | Hale et al. |
| 2007/0066731 A1 * | 3/2007 | Tattum et al. ................ 524/311 |
| 2007/0241309 A1 | 10/2007 | Uradnisheck |
| 2008/0161472 A1 | 7/2008 | Jenkins et al. |
| 2008/0255280 A1 * | 10/2008 | Sims et al. ..................... 524/176 |
| 2008/0277622 A1 * | 11/2008 | Deshpande et al. ..... 252/188.28 |
| 2009/0030115 A1 | 1/2009 | Liu |
| 2009/0278087 A1 * | 11/2009 | Deshpande et al. ..... 252/188.28 |
| 2011/0171405 A1 | 7/2011 | Deshpande |
| 2011/0251395 A1 | 10/2011 | Deshpande et al. |
| 2011/0275750 A1 * | 11/2011 | Bene et al. .................... 524/310 |
| 2012/0095144 A1 * | 4/2012 | Roelofs .................... C08J 3/203 524/311 |
| 2012/0175555 A1 | 7/2012 | Menozzi et al. |
| 2012/0199515 A1 | 8/2012 | Peters et al. |
| 2013/0158182 A1 | 6/2013 | Menozzi et al. |

FOREIGN PATENT DOCUMENTS

| AU | 2008251476 | 5/2008 |
|---|---|---|
| AU | 2008251476 A1 | 11/2008 |
| AU | 20100303748 | 9/2010 |
| AU | 2010319298 | 11/2010 |
| AU | 2010319302 | 11/2010 |

(Continued)

OTHER PUBLICATIONS

Bandi, S. et al., The mechanism of color generation in poly(ethylene terephthalate) / polyamide blends, Polymer Degradation and Stability, 2005, 88: pp. 341-348.

(Continued)

*Primary Examiner* — Marc Zimmer
(74) *Attorney, Agent, or Firm* — Ballard Spahr LLP

(57) ABSTRACT

The disclosure relates to oxygen scavenging polymer compositions, methods of making the compositions, articles prepared from the compositions, and methods of making the articles. This abstract is intended as a scanning tool for purposes of searching in the particular art and is not intended to be limiting of the present invention.

61 Claims, 5 Drawing Sheets

(56) References Cited

FOREIGN PATENT DOCUMENTS

| | | |
|---|---|---|
| AU | 2010319384 | 11/2010 |
| AU | 2014224080 | 9/2014 |
| CA | 1272341 A | 7/1990 |
| CA | 2247985 A1 | 9/1997 |
| CA | 2687081 | 5/2008 |
| CA | 2779714 | 9/2010 |
| CA | 2780746 | 11/2010 |
| CA | 2780749 | 11/2010 |
| CA | 2780768 | 11/2010 |
| CA | 2780768 A1 | 5/2011 |
| CL | 1391/2008 | 5/2008 |
| CN | 101072820 A | 11/2007 |
| CN | 200880023116.X | 5/2008 |
| CN | 101193976 A | 6/2008 |
| CN | 101688020 A | 3/2010 |
| CN | 2013106426272 | 12/2013 |
| DE | 134980 C | 6/1901 |
| DE | 442774 C | 4/1927 |
| EP | 0144807 A2 | 6/1985 |
| EP | 08795847.6 | 5/2008 |
| EP | 10822439.5 | 9/2010 |
| EP | 10830816.4 | 11/2010 |
| EP | 10830818.0 | 11/2010 |
| EP | 10830821.4 | 11/2010 |
| EP | 14150235.1 | 1/2014 |
| GB | 1490671 A | 11/1977 |
| HK | 10107172.3 | 7/2010 |
| IN | 7423/DELNP/2009 | 5/2008 |
| JP | H01-026667 | 1/1989 |
| JP | 2010-507697 | 5/2008 |
| JP | 2013-105954 | 5/2013 |
| JP | 5697445 B2 | 4/2015 |
| JP | 2016040389 A | 3/2016 |
| JP | 5944861 B2 | 7/2016 |
| KR | 10-2009-7025208 | 5/2008 |
| MX | MX/a/2009/012183 | 5/2008 |
| MX | MX/a/2013/001496 | 2/2013 |
| RU | 2307846 C2 | 10/2007 |
| RU | 2009145713 | 5/2008 |
| RU | 2406741 C2 | 12/2010 |
| RU | 2009145713 A | 6/2011 |
| RU | 2013142425 | 9/2013 |
| TW | 103123705 | 7/2014 |
| WO | WO-1995/02616 A2 | 1/1995 |
| WO | WO-199502616 A2 | 1/1995 |
| WO | WO-2003/109643 | 6/2003 |
| WO | WO-2004/063247 A1 | 7/2004 |
| WO | WO-2005073272 A1 | 8/2005 |
| WO | WO-2006/062816 A2 | 6/2006 |
| WO | WO-2006/088889 A2 | 8/2006 |
| WO | PCT/US2008/063250 | 5/2008 |
| WO | WO-2008/141185 A1 | 11/2008 |
| WO | WO-2009/152114 A1 | 12/2009 |
| WO | PCT/US2010/050719 | 9/2010 |
| WO | PCT/US2010/056585 | 11/2010 |
| WO | PCT/US2010/056594 | 11/2010 |
| WO | PCT/US2010/056598 | 11/2010 |
| WO | WO-2013/165971 A1 | 11/2013 |

OTHER PUBLICATIONS

Buhleier, E., et al., 2,6-Bis(aminomethyl)pyridine als Komplexligand und neues Kronenethersynthon, Justus Liebigs Annalen der Chemie, 1978, No. 4: pp. 537-544.

Böhme, H. et al., Untersuchungen in der Phthalimidin-Reihe, Die Pharmazie, 1970, 25: pp. 283-289.

Chen et al., Efficient enhancement of DNA cleavage activity by introducing guanidinium groups into diiron(III) complex, Bioorganic & Medicinal Chemistry Letters, Pergamon, Elsevier Science, GB, vol. 18, No. 1, Nov. 5, 2007 (Nov. 5, 2007), pp. 109-113.

Communication pursuant to Article 94(3) EPC dated May 28, 2015 for EP Pat. App. No. 14150235.1, filed Jan. 6, 2014 (Inventor—G. Deshpande et al.; Applicant—Constar International, Inc.; pp. 1-4).

Communication pursuant to Article 94(3) EPC dated Mar. 18, 2016 for EP Pat. App. No. 14150235.1, filed Jan. 6, 2014 (Inventor—G. Deshpande et al.; Applicant—Constar International, Inc.; pp. 1-2).

Communication pursuant to Article 94(3) EPC dated Apr. 14, 2014 for EP Pat. App. No. 10830816.4, filed Nov. 12, 2010 and published as 2499134 on Sep. 19, 2012 (Inventor—G. Deshpande et al.; pp. 1-2).

Communication pursuant to Article 94(3) EPC dated Jun. 19, 2015 for EP Pat. App. No. 10830816.4, filed Nov. 12, 2010 and published as 2499134 on Sep. 19, 2012 (Inventor—G. Deshpande et al.; pp. 1- 2).

Communication pursuant to Article 94(3) EPC dated Dec. 16, 2016 by the European Patent Office for Application No. 10830821.4, which was filed on Nov. 12, 2010 and published as 2499182 on Sep. 19, 2012 (Inventor—Girish N. Deshpande) (6 pages).

Communication under Rule 71(3) EPC dated Sep. 7, 2016 for EP Pat. App. No. 10822439.5, filed Sep. 29, 2010 (Inventor—G. Deshpande et al.; Applicant—Constar International, Inc.; pp. 1-67).

European Search Opinion dated Aug. 27, 3015 by the European Patent Office for Application No. 10830821.4, which was filed on Nov. 12, 2010 and published as 2499182 on Sep. 19, 2012 (Inventor—Girish N. Deshpande)) (5 pages).

Examination Report dated Sep. 20, 2012 for AU Pat. App. No. 2008251476, national phase of Intl. App. No. PCT/US2008/063250, filed May 9, 2008 (Inventor—G. Deshpande et al.; Applicant—Constar International, Inc.; pp. 1-3).

Examination Report dated Dec. 1, 2016 by the European Patent Office for EP Application No. 2016203377, which was filed on May 4, 2016 and published as (Applicant—Plastipak Packaging, Inc.) (3 pages).

Examination Report dated Sep. 10, 2015 by the Australian Patent Office for AU Application No. 2010303748, which was filed on Sep. 29, 2010 (Inventor—Girish N. Deshpande) (2 pages).

Examination Report dated Sep. 4, 2015 by the Australian Patent Office for AU Application No. 2010319384, which was filed on Nov. 12, 2010 (Inventor—Girish N. Deshpande) (4 pages).

Examiner Initiated Interview Summary dated Nov. 18, 2014 for U.S. Appl. No. 12/945,351, filed Nov. 12, 2010 (Inventor—G. Deshpande; Applicant—Constar International, Inc.; pp. 1-1).

ExParte Quayle Action dated Nov. 5, 2015 by the U.S. Patent and Trademark Office for U.S. Appl. No. 13/849,797, filed Mar. 25, 2013 and published as US-2014-0027339-A1 on Jan. 30, 2014 (Inventor—Girish N. Deshpande) (5 pages).

Extended European Search Report dated Mar. 9, 2013 for EP Pat. App. No. 10830816.4, and published as 2499134 on Sep. 19, 2012 (Inventor—G. Deshpande; Applicant—Constar International, Inc.; pp. 1-7).

Extended European Search Report dated Jun. 17, 2014 for EP Pat. App. No. 14150235.1, filed Jan. 6, 2014 (Inventor—G. Deshpande et al.; Applicant—Constar International, Inc.; pp. 1-9).

Final Office Action dated May 7, 2014 for U.S. Appl. No. 12/945,351, filed Nov. 12, 2010 (Inventor—G. Deshpande; Applicant—Constar International, Inc.; pp. 1-6).

Final Office Action dated Jun. 19, 2014 for U.S. Appl. No. 13/849,797, filed Mar. 25, 2013 (Inventor—G. Deshpande et al.; Applicant—Constar International, Inc.; pp. 1-4).

Final Office Action dated Jan. 23, 2017 by the Japanese Patent Office for Japanese Application No. 2015-249201, which was filed on Dec. 22, 2015 (Inventor—Girish N. Deshpande et al) (Original 2 pages// Translated 2 pages).

First Examination Report dated Dec. 19, 2014 for Indian Application No. 7423/DELNP/2009, which was filed on May 9, 2008 (Inventor—G. Deshpande et al.) (pp. 1-2).

First Office Action dated Dec. 11, 2015 for Chinese Application No. 2013106426272, which was filed on Dec. 3, 2013 and published as CN104017241 on Sep. 3, 2014 (Inventor—G. Deshpande et al.; Applicant—Constar International, Inc.; Original—3 pages// Translated—6 pages).

(56) References Cited

OTHER PUBLICATIONS

First Office Action dated Jul. 6, 2011 for CN Pat. App. No. 200880023116.X, which is national phase of Intl. App. No. PCT/US2008/063250, filed May 9, 2008 (Inventor—G. Deshpande et al.; Applicant—Constar International, Inc.; pp. 1-7).
First Office Action dated Apr. 1, 2015 by the Canadian Patent Office for Canadian Application No. 2687081, which was filed on May 9, 2008 (Inventor—Girish N. Deshpande) (3 pages).
First Office Action dated Jun. 30, 2016 by the Japanese Patent Office for Japanese Application No. 2015-249201, which was filed on Dec. 22, 2015 (Inventor—Girish N. Deshpande et al) (Original 2 pages// Translated 2 pages).
Grawe, T. et al., Self-Assembly of Ball-Shaped Molecular Complexes in Water, Journal of Organic Chemistry, 2002, vol. 67(11): pp. 3755-3763.
Hu, Y.S. et al., Improving Transparency of stretched PET/MXD6 blends by modifying PET with isophthalate, Polymer, Elsevier Science, vol. 46 No. 14 Jun. 2005 pp. 5202-5210.
International Preliminary Report on Patentability dated Apr. 12, 2012 for Intl. App. No. PCT/US2010/050719, Sep. 29, 2010 (Inventor—G. Deshpande; Applicant—Constar International, Inc.; pp. 1-5).
International Preliminary Report on Patentability dated May 24, 2012 for Intl. App. No. PCT/US2010/056585, Nov. 12, 2010 (Inventor—G. Deshpande; Applicant—Constar International, Inc.; pp. 1- 6).
International Preliminary Report on Patentability dated May 24, 2012 for Intl. App. No. PCT/US2010/056594, Nov. 12, 2010 (Inventor—G. Deshpande; Applicant—Constar International, Inc.; pp. 1-5).
International Preliminary Report on Patentability dated May 24, 2012 for Intl. App. No. PCT/US2010/056598, Nov. 12, 2010 (Inventor—G. Deshpande; Applicant—Constar International, Inc.; pp. 1-7).
International Preliminary Report on Patentability dated Nov. 10, 2009 for Intl. App. No. PCT/US2008/063250, filed May 9, 2008 (Inventor—G. Deshpande et al.; Applicant—Constar International, Inc.; pp. 1- 7).
International Search Report with Written Opinion dated Oct. 29, 2008 for Intl. App. No. PCT/US2008/063250, filed May 9, 2008 (Inventor—G. Deshpande et al.; Applicant—Constar International, Inc.; pp. 1-14).
International Search Report with Written Opinion dated Jun. 27, 2011 for Intl. App. No. PCT/US2010/050719, Sep. 29, 2010 (Inventor—G. Deshpande; Applicant—Constar International, Inc.; pp. 1-7).
International Search Report with Written Opinion dated Jul. 25, 2011 for Intl. App. No. PCT/US2010/056585, Nov. 12, 2010 (Inventor—G. Deshpande; Applicant—Constar International, Inc.; pp. 1-8).
International Search Report with Written Opinion dated on Jul. 28, 2011 for Intl. App. No. PCT/US2010/056594, Nov. 12, 2010 (Inventor—G. Deshpande; Applicant—Constar International, Inc.; pp. 1-8).
International Search Report with Written Opinion dated Aug. 2, 2011 for Intl. App. No. PCT/US2010/056598, Nov. 12, 2010 (Inventor—G. Deshpande; Applicant—Constar International, Inc.; pp. 1-13).
Issue Notification dated Apr. 10, 2013 for U.S. Appl. No. 13/164,477, filed Jun. 20, 2011 (Inventor—G. Deshpande et al.; Applicant—Constar International, Inc.; 1 page).
Issue Notification dated Oct. 21, 2015 for U.S. Appl. No. 12/945,351, filed Nov. 12, 2010 (Inventor—G. Deshpande; Applicant—Constar International, Inc.; pp. 1-7).
Issue Notification dated May 21, 2014 for U.S. Appl. No. 12/945,353, filed Nov. 12, 2010 (Inventor—G. Deshpande; Applicant—Constar International, Inc.; 1 page).
Issue Notification dated May 8, 2013 for U.S. Appl. No. 12/945,355, filed Nov. 12, 2010 (Inventor—G. Deshpande et al.; Applicant—Constar International, LLC; 1 page).
Issue Notification dated Oct. 5, 2016 to the U.S. Patent and Trademark Office for U.S. Appl. No. 13/849,797, filed Mar. 25, 2013 and published as US-2014-0027339-A1 on Jan. 30, 2014 (Inventor—Girish N. Deshpande) (1 pages).
Issue Notification dated Oct. 5, 2016 to the U.S. Patent and Trademark Office for U.S. Appl. No. 13/849,797, filed Mar. 25, 2013 and published as US-2014-0027339-A1 on Jan. 30, 2014 (Inventor—Girish N. Deshpande)(1 page).
Issue Notification dated Dec. 9, 2015 for U.S. Appl. No. 13/889,133, filed May 7, 2013 (Inventor—G. Deshpande et al.; Applicant—Constar International, Inc.; pp. 1-8).
Issue Notification dated Jul. 20, 2011 for U.S. Appl. No. 12/117,849, filed May 9, 2008 (Inventor—G. Deshpande et al.; Applicant—Constar International, Inc.; 1 page).
Kricheldorf, H.R., 15N NMR Spectroscopy 28-Solvent Effects on the 15N-13C Coupling Constants of Amides, Imides, Ureas and Polypeptides, OMR Organic Magnetic Resonance, 1980, vol. 14(6): pp. 455-561.
M Knollmüller, 1,2,4,5-Tetrahydro-3,2,4-benzothiadiazepin-3,3-dioxide and 1,2,3,5,6,7-Hexahydro-4,3,5-benzothiadiazonin-4,4-dioxide, Monatshefte für Chemie, 1974, 105, pp. 114-122.
Mauro Vieira de Almeida et al., Thalidomide Analogs from Diamines: Synthesis and Evaluation as Inhibitors of TNF-[alpha] Production, Chemical & Pharmaceutical Bulletin, 2007, vol. 55(2): pp. 223-226.
Non Final Rejection dated Jan. 15, 2015 for U.S. Appl. No. 13/889,133, filed May 7, 2013 (Inventor—G. Deshpande et al.; Applicant—Constar International, Inc.; pp. 1-6).
Non Final Rejection dated Feb. 8, 2017 by the U.S. Patent and Trademark Office for U.S. Appl. No. 14/935,953, filed Nov. 9, 2015 (Inventor—Girish N. Deshpande) (19 pages).
Non Final Rejection dated Sep. 30, 2016 to the U.S. Patent and Trademark Office for U.S. Appl. No. 14/585,413, filed Dec. 30, 2014 (Inventor—Girish N. Deshpande) (pp. 1-8).
Non-Final Office Action dated Apr. 29, 2013 for U.S. Appl. No. 12/945,353, filed Nov. 12, 2010 (Inventor—G. Deshpande; Applicant—Constar International, Inc.; pp. 1-8).
Non-Final Office Action dated Sep. 3, 2013 for U.S. Appl. No. 12/945,351, filed Nov. 12, 2010 (Inventor—G. Deshpande; Applicant—Constar International, Inc.; pp. 1-6).
Non-Final Office Action dated Jan. 20, 2011 for U.S. Appl. No. 12/117,849, filed May 9, 2008 (Inventor—G. Deshpande et al.; Applicant—Constar International, Inc.; pp. 1-5).
Non-Final Office Action dated Nov. 18, 2014 for U.S. Appl. No. 12/945,351, filed Nov. 12, 2010 (Inventor—G. Deshpande; Applicant—Constar International, Inc.; pp. 1-6).
Non-Final Office Action dated Dec. 5, 2013 for U.S. Appl. No. 13/849,797, filed Mar. 25, 2013 (Inventor—G. Deshpande et al.; Applicant—Constar International, Inc.; pp. 1-6).
Notice of Allowance dated Jan. 16, 2013 for U.S. Appl. No. 12/945,355, filed Nov. 12, 2010 (Inventor—G. Deshpande et al.; Applicant—Constar International, LLC; pp. 1-5).
Notice of Allowance dated Jan. 22, 2014 for U.S. Appl. No. 12/945,353, filed Nov. 12, 2010 (Inventor—G. Deshpande; Applicant—Constar International, Inc.; pp. 1-5).
Notice of Allowance dated Jun. 30, 2015 for U.S. Appl. No. 12/945,351, filed Nov. 12, 2010 (Inventor—G. Deshpande; Applicant—Constar International, Inc.; pp. 1-7).
Notice of Allowance dated Sep. 26, 2012 for U.S. Appl. No. 12/945,355, filed Nov. 12, 2010 (Inventor—G. Deshpande et al.; Applicant—Constar International, LLC; pp. 1-19).
Notice of Allowance dated Dec. 23, 2011 for U.S. Appl. No. 13/164,477, filed Jun. 20, 2011 (Inventor—G. Deshpande et al.; Applicant—Constar International, Inc.; pp. 1-8).
Notice of Allowance dated Dec. 24, 2012 for U.S. Appl. No. 13/164,477, filed Jun. 20, 2011 (Inventor—G. Deshpande et al.; Applicant—Constar International, Inc.; pp. 1-7).
Notice of Allowance dated Jun. 24, 2011 for U.S. Appl. No. 12/117,849, filed May 9, 2008 (Inventor—G. Deshpande et al.; Applicant—Constar International, Inc.; pp. 1-7).
Notice of Allowance dated Jan. 20, 2016 by the Canadian Patent Office for Canadian Application No. 2687081 which was filed on May 9, 2008 (Inventor—Girish N. Deshpande) (1 page).

(56) References Cited

OTHER PUBLICATIONS

Notice of Allowance dated Jan. 5, 2016 by the Taiwan Patent Office for Taiwan Application No. 103123705 which was filed on Jul. 19, 2014 and published as 201439163 on Oct. 16, 2014 (Inventor—Girish N. Deshpande) (3 pages).
Notice of Allowance dated Jun. 8, 2016 to the U.S. Patent and Trademark Office for U.S. Appl. No. 13/849,797, filed Mar. 25, 2013 and published as US-2014-0027339-A1 on Jan. 30, 2014 (Inventor—Girish N. Deshpande) (7 pages).
Notice of Allowance dated Aug. 17, 2016 to the U.S. Patent and Trademark Office for U.S. Appl. No. 13/849,797, filed Mar. 25, 2013 and published as US-2014-0027339-A1 on Jan. 30, 2014 (Inventor—Girish N. Deshpande) (4 pages).
Notice of Allowance dated Aug. 17, 2015 for U.S. Appl. No. 13/889,133, filed May 7, 2013 (Inventor—G. Deshpande et al.; Applicant—Constar International, Inc.; pp. 1-8).
Notice of Appeal dated Dec. 19, 2014 to the U.S. Patent and Trademark Office for U.S. Appl. No. 13/849,797, filed Mar. 25, 2013 and published as US-2014-0027339-A1 on Jan. 30, 2014 (Inventor—Girish N. Deshpande) (2 pages).
Office Action dated Apr. 19, 2012 for MX Pat. App. No. MX/a/2009/012183, which is national phase of Intl. App. No. PCT/US2008/063250, filed May 9, 2008 (Inventor—G. Deshpande et al.; Applicant—Constar International, Inc.; pp. 1-2).
Office Action dated Sep. 30, 2011 for CL Pat. App. No. 1391-08, national phase of Intl. App. No. PCT/US2008/063250, filed May 9, 2008 (Inventor—G. Deshpande et al.; Applicant—Constar International, Inc.; pp. 1-21).
Office Action dated Sep. 23, 2011 for MX Pat. App. No. MX/a/2009/012183, which is national phase of Intl. App. No. PCT/US2008/063250, filed May 9, 2008 (Inventor—G. Deshpande et al.; Applicant—Constar International, Inc.; pp. 1-3).
Office Action dated Mar. 30, 2015 by the Taiwan Patent Office for Taiwan Application No. 103123705 which was filed on Jul. 19, 2014 and published as 201439163 on Oct. 16, 2014 (Inventor—Girish N. Deshpande) (10 pages).
Office Action dated Jan. 16, 2017 by the Canadian Patent Office for Canadian Application No. 2779714, which was filed on Sep. 29, 2010 (Inventor—Girish N. Deshpande) (3 pages).
Office Action dated Dec. 9, 2016 by the Canadian Patent Office for CA Application No. 2,780,749, which was filed on Nov. 12, 2010 and published as (Applicant—Plastipak Packaging, Inc. ) (5 pages).
Office Action dated Apr. 21, 2016 by the Canadian Patent Office for Canadian Application No. 2779714, which was filed on Sep. 29, 2010 (Inventor—Girish N. Deshpande) (3 pages).
Office Action dated Jul. 27, 2016 by the Canadian Patent Office for Canadian Application No. 2,780,768, which was filed on Nov. 12, 2010 (Inventor—Girish N. Deshpande) (4 pages).
Office Action dated Sep. 13, 2016 by the Canadian Patent Office for Canadian Application No. 2,780,746, which was filed on Nov. 12, 2010 (Inventor—Girish N. Deshpande) (4 pages).
Preliminary Amendment dated Mar. 25, 2013 for U.S. Appl. No. 13/849,797, filed Mar. 25, 2013 (Inventor—G. Deshpande et al.; Applicant—Constar International, Inc.; pp. 1-3).
Preliminary Amendment dated Oct. 15, 2013 for U.S. Appl. No. 13/849,797, filed Mar. 25, 2013 (Inventor—G. Deshpande et al.; Applicant—Constar International, Inc.; pp. 1-14).
Preliminary Amendment dated Nov. 21, 2012 for EP Pat. App. No. 10822439.5, national phase of Intl. App. No. PCT/US2010/050719, Sep. 29, 2010 (Inventor—G. Deshpande; Applicant—Constar International, Inc.; pp. 1-15).
Preliminary Amendment dated Dec. 10, 2009 for EP Pat. App. No. 08795847.6, which is national phase of Intl. App. No. PCT/US2008/063250, filed May 9, 2008 (Inventor—G. Deshpande et al.; Applicant—Constar International, Inc.; pp. 1-5).
Preliminary Amendment dated Oct. 15, 2015 to the U.S. Patent and Trademark Office for U.S. Appl. No. 14/585,413, filed Dec. 30, 2014 (Inventor—Girish N. Deshpande) (pp. 1-9).
Preliminary Amendment dated Apr. 25, 2016 to the U.S. Patent and Trademark Office for U.S. Appl. No. 14/935,953, filed Nov. 9, 2015 (Inventor—Girish N. Deshpande) (pp. 1-23).
Preliminary Amendment dated Jul. 11, 2016 to the U.S. Patent and Trademark Office for U.S. Appl. No. 14/976,766, filed Dec. 21, 2015 (Inventor—Girish N. Deshpande) (pp. 1-5).
Ragusa, A. et al, Novel Enantioselective Receptors for N-Protected; Glutamate and Aspartate, Chemistry—A European Journal, vol. 11, No. 19, Sep. 19, 2005 (Sep. 19, 2005), pp. 5674-5688.
Reponse to Communication pursuant to Article 94(3) EPC dated Dec. 7, 2015 for EP Pat. App. No. 14150235.1, filed Jan. 6, 2014 (Inventor—G. Deshpande et al.; Applicant—Constar International, Inc.; pp. 1-2).
Requirement for Restriction/Election dated May 7, 2012 for U.S. Appl. No. 12/945,355, filed Nov. 12, 2010 (Inventor—G. Deshpande et al.; Applicant—Constar International, LLC; pp. 1-11).
Requirement for Restriction/Election dated Jun. 12, 2012 for U.S. Appl. No. 12/945,351, filed Nov. 12, 2010 (Inventor—G. Deshpande et al.; Applicant—Constar International, Inc.; pp. 1-10).
Requirement for Restriction/Election dated Oct. 5, 2010 for U.S. Appl. No. 12/117,849, filed May 9, 2008 (Inventor—G. Deshpande et al.; Applicant—Constar International, Inc.; pp. 1-5).
Requirement for Restriction/Election dated Nov. 2, 2012 for U.S. Appl. No. 12/945,353, filed Nov. 12, 2010 (Inventor—G. Deshpande et al.; Applicant—Constar International, Inc.; pp. 1-10).
Requirement for Restriction/Election dated Dec. 20, 2012 for U.S. Appl. No. 12/945,351, filed Nov. 12, 2010 (Inventor—G. Deshpande; Applicant—Constar International, Inc.; pp. 1-8).
Requirement for Restriction/Election dated Apr. 24, 2014 for U.S. Appl. No. 13/889,133, filed May 7, 2013 (Inventor—G. Deshpande et al.; Applicant—Constar International, Inc.; pp. 1-9).
Response after Final Office Action dated Oct. 7, 2014 for U.S. Appl. No. 12/945,351, filed Nov. 12, 2010 (Inventor—G. Deshpande; Applicant—Constar International, Inc.; pp. 1-7).
Response after Non-Final Office Action dated Mar. 4, 2014 for U.S. Appl. No. 12/945,351, filed Nov. 12, 2010 (Inventor—G. Deshpande; Applicant—Constar International, Inc.; pp. 1-34).
Response after Non-Final Office Action dated May 18, 2015 for U.S. Appl. No. 12/945,351, filed Nov. 12, 2010 (Inventor—G. Deshpande; Applicant—Constar International, Inc.; pp. 1-7).
Response after Non-Final Office Action dated Jun. 4, 2014 for U.S. Appl. No. 13/849,797, filed Mar. 25, 2013 (Inventor—G. Deshpande et al.; Applicant—Constar International, Inc.; pp. 1-17).
Response after Non-Final Office Action dated Oct. 29, 2013 for U.S. Appl. No. 12/945,353, filed Nov. 12, 2010 (Inventor—G. Deshpande; Applicant—Constar International, Inc.; pp. 1-10).
Response after Non-Final Office Action dated Apr. 8, 2011 for U.S. Appl. No. 12/117,849, filed May 9, 2008 (Inventor—G. Deshpande et al.; Applicant—Constar International, Inc.; pp. 1-16).
Response to Communication pursuant to Article 94(3) EPC dated Oct. 24, 2014 for EP Pat. App. No. 10830816.4, filed Nov. 12, 2010 and published as 2499134 on Sep. 19, 2012 (Inventor—G. Deshpande et al.; pp. 1-2).
Response to Communication pursuant to Article 94(3) EPC dated Apr. 5, 2016 for EP Pat. App. No. 10830816.4, filed Nov. 12, 2010 and published as 2499134 on Sep. 19, 2012 (Inventor—G. Deshpande et al.; pp. 1-2).
Response to Election/Restriction Requirement dated Mar. 4, 2013 for U.S. Appl. No. 12/945,353, filed Nov. 12, 2010 (Inventor—G. Deshpande; Applicant—Constar International, Inc.; pp. 1-3).
Response to Election/Restriction Requirement dated Aug. 7, 2012 for U.S. Appl. No. 12/945,355, filed Nov. 12, 2010 (Inventor—G. Deshpande et al.; Applicant—Constar International, LLC; pp. 1-6).
Response to Election/Restriction Requirement dated Dec. 17, 2010 for U.S. Appl. No. 12/117,849, filed May 9, 2008 (Inventor—G. Deshpande et al.; Applicant—Constar International, Inc.; pp. 1-3).
Response to ExParte Quayle Action dated May 5, 2016 to the U.S. Patent and Trademark Office for U.S. Appl. No. 13/849,797, filed Mar. 25, 2013 and published as US-2014-0027339-A1 on Jan. 30, 2014 (Inventor—Girish N. Deshpande) (2 pages).
Response to First Examination Report dated Dec. 10, 2015 for Indian Application No. 7423/DELNP/2009, which was filed on May 9, 2008 (Inventor—G. Deshpande et al.) (pp. 1-262).

(56) References Cited

OTHER PUBLICATIONS

Response to Non Final Rejection dated Jul. 14, 2015 to the U.S. Appl. No. 13/889,133, filed May 7, 2013 (Inventor—G. Deshpande et al.; Applicant—Constar International, Inc.; pp. 1-10).
Response to Office Action filed on Dec. 21, 2011 for CN Pat. App. No. 200880023116.X, which is national phase of Intl. App. No. PCT/US2008/063250, filed May 9, 2008 (Inventor—G. Deshpande et al.; Applicant—Constar International, Inc.; pp. 1-37).
Response to Office Action filed on Feb. 3, 2012 for MX Pat. App. No. MX/a/2009/012183, which is national phase of Intl. App. No. PCT/US2008/063250, filed May 9, 2008 (Inventor—G. Deshpande et al.; Applicant—Constar International, Inc.; pp. 1-4).
Response to Office Action dated Mar. 27, 2012 for CL Pat. App. No. 1391/2008, national phase of Intl. App. No. PCT/US2008/063250, filed May 9, 2008 (Inventor—G. Deshpande et al.; Applicant Constar International, Inc.; pp. 1-21).
Response to Office Action dated Aug. 20, 2012 for MX Pat. App. No. MX/a/2009/012183, which is national phase of Intl. App. No. PCT/US2008/063250, filed May 9, 2008 (Inventor—G. Deshpande et al.; Applicant—Constar International, Inc.; pp. 1-2).
Response to Office Action dated Oct. 1, 2015 to the Canadian Patent Office for Canadian Application No. 2687081, which was filed on May 9, 2008 (Inventor—Girish N. Deshpande) (4 pages).
Response to Requirement for Restriction/Election dated Jun. 20, 2013 for U.S. Appl. No. 12/945,351, filed Nov. 12, 2010 (Inventor—G. Deshpande; Applicant—Constar International, Inc.; pp. 1-3).
Response to Requirement for Restriction/Election dated Oct. 12, 2012 for U.S. Appl. No. 12/945,351, filed Nov. 12, 2010 (Inventor—G. Deshpande et al.; Applicant—Constar International, Inc.; pp. 1-3).
Response to Requirement for Restriction/Election dated 49/24/2014 to the U.S. Appl. No. 13/889,133, filed May 7, 2013 (Inventor—G. Deshpande et al.; Applicant—Constar International, Inc.; pp. 1-4).
Restriction Requirement dated Dec. 29, 2016 by the U.S. Patent and Trademark Office for U.S. Appl. No. 14/976,766, filed Dec. 21, 2015 (Inventor—Girish N. Deshpande) (7 pages).
Rossi, S. et al., A Highly Enantioselective Receptor for N-Protected Glutamate and Anomalous Solvent-Dependent Binding Properties, Angew. Chem. Int. Ed., vol. 41, No. 22, 2002, pp. 4233-4236.
Second Office Action dated Sep. 19, 2016 for Chinese Application No. 2013106426272, which was filed on Dec. 3, 2013 and published as CN104017241 on Sep. 3, 2014 (Inventor—G. Deshpande et al.; Applicant—Constar International, Inc.; Original—4 pages// Translated—7 pages).
Second Office Action dated Mar. 16, 2012 for CN Pat. App. No. 200880023116.X, national phase of Intl. App. No. PCT/US2008/063250, filed May 9, 2008 (Inventor—G. Deshpande et al.; Applicant—Constar International, Inc.; pp. 1-11).
Shigeyoshi Hara et al., Allylic Polymers, 1: Synthesis of Polyallyl Compounds Containing 4-Oxycarbonylphthalimido Units and Their Polymers, Die Makromolekulare Chemie, 1975, vol. 176(1): pp. 127-141.
Supplementary European Search Report dated Jul. 30, 2013 by the European Patent Office for Application No. 10822439.5, which was filed on Sep. 29, 2010 and published as 2483342 on Aug. 8, 2012 (Inventor—Girish N. Deshpande) (6 pages).
Supplementary European Search Report dated Aug. 27, 2015 by the European Patent Office for Application No. 10830821.4, which was filed on Nov. 12, 2010 and published as 2499182 on Sep. 19, 2012 (Inventor—Girish N. Deshpande) (2 pages).
Third Office Action dated Jan. 5, 2013 for CN Pat. App. No. 200880023116.X, national phase of Intl. App. No. PCT/US2008/063250, filed May 9, 2008 (Inventor—G. Deshpande et al.; Applicant—Constar International, Inc.; pp. 1-11).
Vacca, A. et al., A New Tripodal Receptor for Molecular Recognition of Monosaccharides. A Paradigm for Assessing Glycoside Binding Affinities and Selectivities by 1H NMR Spectroscopy, Journal of the American Chemical Society, 2004, vol. 126(50): pp. 16456-16465.
Yoshito, T. et al., Novel Self-Assembly of m-Xylylene Type Dithioureas by Head-to-Tail Hydrogen Bonding, J. org. Chem., 1998, vol. 63: pp. 7481-7489.
Zhanthin et al., The synthesis of fluorine-containing azamacrocyclic; compounds, Heterocycles. International Journal for Reviews and Communications in Heterocyclic Chemistry, Elsevier Science Publishers B.V. Amsterdam, NL, vol. 34, No. 9, 1992 pp. 1729-1736.
Second Office Action dated Mar. 31, 2017 by the Canadian Intellectual Property Office for CA Application No. 2780768, which was filed on Nov. 12, 2010 and published as CA 2780768 A1 on May 19, 2011 (Applicant—Plastipak Packaging, Inc.) (3 pages).
Office Action dated Apr. 13, 2017 by the Russian Patent Office for RU Application No. 2013142425, which was filed on Sep. 17, 2013 and published as RU 2013142425 A on Apr. 10, 2015 (Applicant—Plastipak Packaging, Inc.)(Original—5 pages// Translated—3 pages).
Office Action dated May 23, 2017 by the Canadian Intellectual Property Office for CA Appl. No. 2780746, which was filed on Nov. 12, 2010 and published as CA 2780746 A1 on May 19, 2011 (Applicant—Plastipak Packaging, Inc.) (3 pages).
Final Rejection dated Jun. 13, 2017 by the USPTO for U.S. Appl. No. 14/585,413, filed Dec. 30, 2014 and published as US 2016-0376404 A1 on Dec. 29, 2016 (Applicant—Plastipak Packaging, Inc.) (3 pages).
U.S. Appl. No. 12/117,849 (U.S. Pat. No. 7,994,245), filed May 9, 2008 (Aug. 9, 2011), Deshpande et al.
U.S. Appl. No. 13/164,447 (U.S. Pat. No. 8,431,721), filed Jun. 20, 2011 (Apr. 30, 2013), Deshpande et al.
U.S. Appl. No. 13/849,797 (9,475,630), filed Mar. 25, 2013 (Oct. 25, 2016), Deshpande et al.
U.S. Appl. No. 15/147,532, filed May 5, 2016, Deshpande et al.
U.S. Appl. No. 61/261,158, filed Nov. 13, 2009, Deshpande.
U.S. Appl. No. 12/945,351 (U.S. Pat. No. 9,181,414), filed Nov. 12, 2010 (Nov. 10, 2015), Deshpande.
U.S. Appl. No. 14/935,953 (US 2016-0229988 A1), filed Nov. 9, 2015 (Aug. 11, 2016), Deshpande.
U.S. Appl. No. 61/261,209, filed Nov. 13, 2009, Deshpande.
U.S. Appl. No. 12/945,353 (U.S. Pat. No. 8,478,519), filed Nov. 12, 2010 (Jun. 10, 2014), Deshpande.
U.S. Appl. No. 14/258,823 (U.S. Pat. No. 8,975,345), filed Apr. 22, 2014 (Mar. 10, 2015), Deshpande.
U.S. Appl. No. 14/585,413, filed Dec. 30, 2014, Deshpande.
U.S. Appl. No. 61/261,219, filed Nov. 13, 2009, Deshpande
U.S. Appl. No. 12/945,355 (U.S. Pat. No. 8,450,398), filed Nov. 12, 2010 (May 28, 2013), Deshpande.
U.S. Appl. No. 13/889,133 (U.S. Pat. No. 9,222,020), filed May 7, 2013 (Dec. 29, 2015), Deshpande.
U.S. Appl. No. 14/976,766, Dec. 21, 2015, Deshpande.
Australian Examination Report dated Dec. 1, 2016 by the Australian Patent Office for AU Application No. 2016203377, which was filed on May 4, 2016 and published as (Applicant—Plastipak Packaging, Inc.) (3 pages).
Decision of Refusal dated Jan. 23, 2017 by SIPO for JP Application No. 2015-249201, which was filed on Dec. 22, 2015 (Applicant—Plastipak Packaging, Inc.) (Original 2 pages// Translated 2 pages).
Office Action dated Jan. 16, 2017 by the Canadian Patent Office for CA Application No. 2,779,714, which was filed on Sep. 29, 2010 (Applicant—Plastipak Packaging, Inc.) (3 pages).
Non Final Rejection dated Feb. 8, 2017 by the U.S. Patent and Trademark Office for U.S. Appl. No. 14/935,953, filed Nov. 9, 2015 and published as US-2016-0229988-A1 on Aug. 11, 2016 (Applicant—Plastipak Packaging, Inc.) (20 pages).
Communication pursuant to Article 94(3) EPC dated Dec. 16, 2016 by the European Patent Office for EP Application No. 10830821.4, which was filed on Nov. 12, 2010 and published as 2499182 on Sep. 19, 2012 (Applicant—Plastipak Packaging, Inc.) (6 pages).
Restriction Requirement dated Dec. 29, 2016 by the U.S. Patent and Trademark Office for U.S. Appl. No. 14/976,766, filed Dec. 21, 2015 and published as US 2016-0311771 A1 on Oct. 27, 2016 (Applicant—Plastipak Packaging, Inc.) (7 pages).

(56) References Cited

OTHER PUBLICATIONS

Office Action and Search Report dated Jan. 11, 2017 by the Russian Patent Office for RU Application No. 2014148149, which was filed on Apr. 30, 2013 and published as 17 on Jun. 20, 2016 (Applicant—Plastipak Packaging, Inc.) (8 pages).
Office Action dated Feb. 14, 2017 by Japanese Patent Office for JP Application No. 2015-510375, which was filed on Apr. 30, 2013 (Applicant—Plastipak Packaging, Inc.) (Original—5 // Translated—7 pages).
Office Action dated Feb. 13, 2017 by the Canadian Patent Office for CA Application No. 2,893,166, which was filed on Feb. 15, 2016 (Applicant—Plastipak Packaging, Inc.) (3 pages).
Non Final Rejection dated Feb. 27, 2017 by the U.S. Patent and Trademark Office for U.S. Appl. No. 14/466,717, filed Aug. 22, 2014 and published as US 2016-0052694 A1 on Feb. 25, 2016 (Applicant—Plastipak Packaging, Inc.) (35 pages).
Non Final Rejection dated Jan. 27, 2017 by the U.S. Patent and Trademark Office for U.S. Appl. No. 14/517,643, filed Aug. 22, 2014 and published as US 2016-0108207 A1 on Apr. 21, 2016 (Applicant—Plastipak Packaging, Inc.) (12 pages).
Second Office Action dated Jan. 3, 2017 by SIPO for CN Application No. 201380025753.1, which was filed on Apr. 30, 2013 and published as 104379654 on Feb. 25, 2015 (Applicant—Plastipak Packaging Inc.) (Original—5 pages // Translation—8 pages).
Office Action dated Aug. 30, 2017 by the Canadian Intellectual Property Office for Patent Application No. 2779714, which was filed on Sep. 29, 2010 and published on Apr. 14, 2011 (Inventor- Deshpande; Applicant- Plastipak Packaging, Inc.) (3 pages).
Office Action dated Jul. 25, 2017 by the Canadian Intellectual Property Office for Patent Application No. 2780749, which was filed on Nov. 12, 2010 and published on May 19, 2011 (Inventor- Deshpande; Applicant- Plastipak Packaging, Inc.) (3 pages).
Response to Non-Final Office Action filed on Aug. 8, 2017 with the U.S. Patent and Trademark Office for U.S. Appl. No. 14/935,953, filed Nov. 9, 2015 and published as U.S. 2016/0229988 dated Aug. 11, 2016 (Inventor- Deshpande; Applicant-Plastipak Packaging, Inc.) (32 pages).
Final Office Action dated Aug. 31, 2017 by the U.S. Patent and Trademark Office for U.S. Appl. No. 14/935,953, filed Nov. 9, 2015 and published as U.S. 2016/0229988 dated Aug. 11, 2016 (Inventor- Deshpande; Applicant- Plastipak Packaging, Inc.) (9 pages).
Ex Parte Quayle Action dated Sep. 22, 2017 by the U.S. Patent and Trademark Office for U.S. Appl. No. 14/976,766, filed Dec. 21, 2015 and published as U.S. 2016/0311771 dated Oct. 27, 2016 (Inventor- Deshpande; Applicant- Plastipak Packaging, Inc.) (7 pages).

\* cited by examiner

COLORANT COMPATIBLE OXYGEN SCAVENGING POLYMER COMPOSITIONS AND ARTICLES MADE FROM SAME

CROSS REFERENCE TO RELATED APPLICATIONS

This application claims the benefit of priority to U.S. Provisional Patent Application Ser. No. 61/246,956 filed Sep. 29, 2009, the entire disclosure of which is hereby incorporated by reference.

BACKGROUND

Many polymers used in packaging materials and other articles are permeable to oxygen. When oxygen permeates a polymeric composition or article, it can cause oxidative damage. It is therefore desirable for certain polymer compositions and articles to have oxygen scavenging capability, such that when oxygen permeates the composition or article, oxidative damage can be mitigated.

It can be desirable to have a colorant in oxygen scavenging polymer compositions, such as those used for preparing articles for food and beverage packaging, among others. Oftentimes, the addition of a colorant to such a composition interferes with the oxygen scavenging properties. To overcome this problem, it is possible to reformulate the colorant such that the colorant no longer interferes, or interferes less, with the oxygen scavenging capability of the composition. However, this approach relies on an iterative process wherein a colorant is mixed with a composition, oxygen scavenging is tested, and if oxygen scavenging is unacceptable, the colorant is reformulated until a suitable composition is obtained. This process is time consuming and often results in unacceptable formulations.

Another approach involves simply using colorants that do not interfere, or interfere at an acceptable level, with the oxygen scavenging capabilities of the composition. However, this approach requires an identification of colorants that meet these criteria. This process is also time consuming and does not allow for the use of some colorants that are incompatible with composition but that may nevertheless be desirable.

Thus, there is a need for oxygen scavenging polymer compositions that are compatible with colorants, such that the addition of the colorant to the composition does not unduly interfere with the oxygen scavenging properties of the composition. These needs and other needs are satisfied by the present invention.

SUMMARY

In accordance with the purpose(s) of the invention, as embodied and broadly described herein, the invention, in one aspect, relates to oxygen scavenging polymer compositions, methods of making the compositions, articles prepared from the compositions, and methods of making the articles.

Disclosed are melt blended polymer compositions comprising: a. a base polymer; b. an N-allylic amide compound or N-benzylic amide compound present in an amount of from about 0.10 to about 10 weight percent of the composition; c. a transition metal in a positive oxidation state, the metal present in an amount of from about 10 ppm to about 400 ppm; d. a visually effective amount of colorant, and e. a nonionic colorant harmonizer present in an amount of from about 0.01 to about 10 weight percent of the composition, wherein the composition has an OTR of less than about 0.1 cc/pkg/day (for bottles) or 5 cc-mm/m2-atm-day (for films).

Also disclosed are methods for making an oxygen scavenging polymer composition comprising the step of combining a base polymer; an N-allylic amide compound or N-benzylic amide compound; a transition metal in a positive oxidation state; a visually effective amount of colorant, and a nonionic colorant harmonizer present in an amount of from about 0.01 to about 10 weight percent of the composition.

Also disclosed are methods of preparing an article comprising the step of extruding a melted polymer composition, the composition comprising a base polymer; N-allylic- or N-benzylic amide compound present in an amount of from about 0.10 to about 10 weight percent of the composition; transition metal in a positive oxidation state, the metal present in an amount of from about 10 ppm to about 400 ppm; a visually effective amount of colorant, and a nonionic colorant harmonizer present in an amount of from about 0.01 to about 10 weight percent of the composition, thereby forming the article.

Also disclosed are methods of preparing an article comprising the step of blow molding a heated preform comprising a base polymer; N-allylic amide compound or N-benzylic amide compound present in an amount of from about 0.10 to about 10 weight percent of the composition; transition metal in a positive oxidation state, the metal present in an amount of from about 10 ppm to about 400 ppm; a visually effective amount of colorant; and a nonionic colorant harmonizer present in an amount of from about 0.01 to about 10 weight percent of the composition, thereby forming the article.

Also disclosed are the products of the disclosed methods.

Also disclosed are articles comprising a composition of a base polymer; an N-allylic amide compound or N-benzylic amide compound present in an amount of from about 0.10 to about 10 weight percent of the composition; a transition metal in a positive oxidation state, the metal present in an amount of from about 10 ppm to about 400 ppm; a visually effective amount of colorant; and a nonionic colorant harmonizer present in an amount of from about 0.01 to about 10 weight percent of the composition.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Figure 1:
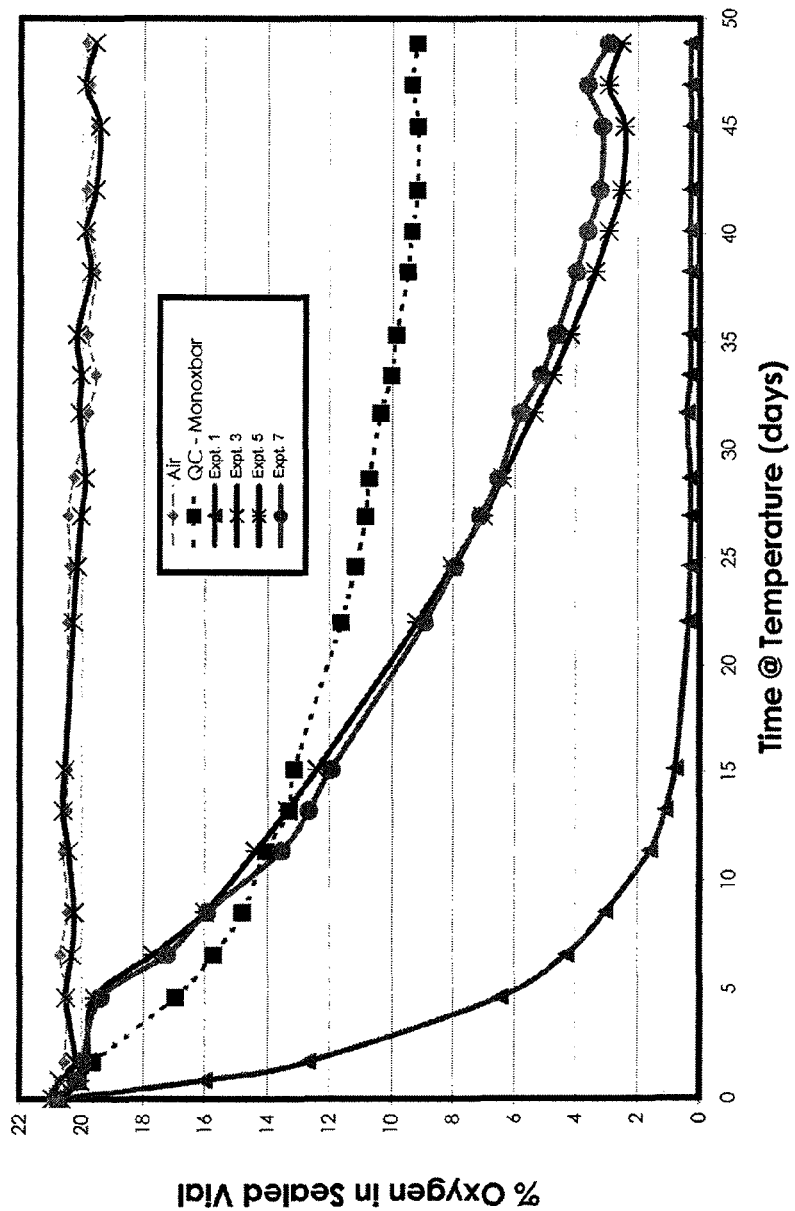
FIG. 1 shows $O_2$ scavenging as a function of time for preforms with and without nonionic colorant compatibilizer. Shown is a plot of % oxygen in a sealed vial vs. time for the composition from Example 1.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including steps in methods of making and using the compositions of the invention. Thus, if there are a variety of additional steps that can be performed it is understood that each of these additional steps can be performed with any specific embodiment or combination of embodiments of the methods of the invention.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance may or may not occur, and that the description includes instances where said event or circumstance occurs and instances where it does not.

As used herein, the term "substantially" means that the subsequently described event or circumstance completely occurs or that the subsequently described event or circumstance generally, typically, or approximately occurs. For example, when the specification discloses that substantially all of an agent is released, a person skilled in the relevant art would readily understand that the agent need not be completely released. Rather, this term conveys to a person skilled in the relevant art that the agent need only be released to an extent that an effective amount is no longer unreleased.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight, from two to six, or form two to four. In one aspect, a collection of oligomers can have an average number of repeating units of from about two to about ten, for example, from about two to about eight, from about two to about six, or form about two to about four.

As used herein, the term "star polymer" refers to a branched polymer molecule in which a single branch point gives rise to multiple linear chains or arms. The single branch point can be a single chemical moiety or can be a highly crosslinked section of polymer. In one aspect, a star polymer can be generally spherical in shape. In a further aspect, a star polymer can be particle shaped. If the arms are identical the star polymer molecule is said to be regular. If adjacent arms are composed of different repeating subunits, the star polymer molecule is said to be variegated.

As used herein, the term "molecular weight" (MW) refers to the mass of one molecule of that substance, relative to the unified atomic mass unit u (equal to $1/12$ the mass of one atom of carbon-12).

As used herein, the term "number average molecular weight" ($M_n$) refers to the common, mean, average of the molecular weights of the individual polymers. $M_n$ can be determined by measuring the molecular weight of n polymer molecules, summing the weights, and dividing by n. $M_n$ is calculated by:

$$\overline{M}_n = \frac{\sum_i N_i M_i}{\sum_i N_i},$$

wherein $N_i$ is the number of molecules of molecular weight $M_i$. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" ($M_w$) refers to an alternative measure of the molecular weight of a polymer. $M_w$ is calculated by:

$$\overline{M}_w = \frac{\sum_i N_i M_i^2}{\sum_i N_i M_i},$$

wherein $N_i$ is the number of molecules of molecular weight $M_i$. Intuitively, if the weight average molecular weight is w, and a random monomer is selected, then the polymer it belongs to will have a weight of w on average. The weight average molecular weight can be determined by light scattering, small angle neutron scattering (SANS), X-ray scattering, and sedimentation velocity.

As used herein, the terms "polydispersity" and "polydispersity index" (PDI) refer to the ratio of the weight average to the number average ($M_w/M_n$).

As used herein, the term "compatibilizing agent" refers to a small molecule or polymer that has both polar and non-polar functional groups. For example, a fatty-acid ester has both polar and non-polar functional groups. According to aspects, at least a portion of the polymer and at least a portion of the amide compound are covalently linked by one or more compatibilizing agents.

A weight percent (wt. %) of a component, unless specifically stated to the contrary, is based on the total weight of the formulation or composition in which the component is included.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure

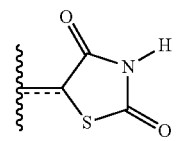

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

In some aspects, a structure of a compound can be represented by a formula:

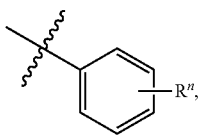

which is understood to be equivalent to a formula:

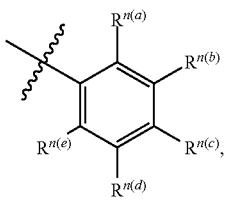

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of from 1 to 24 carbon atoms, for example from 1 to 12 carbons, from 1 to 8 carbons, from 1 to 6 carbons, or from 1 to 4 carbons, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dode cyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including optionally substituted alkyl, cycloalkyl, alkoxy, amino, ether, halide, hydroxy, nitro, silyl, sulfo-oxo, or thiol, as described herein.

A "lower alkyl" group is an alkyl group containing from one to six (e.g., from one to four) carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including optionally substituted alkyl, cycloalkyl, alkoxy, amino, ether, halide, hydroxy, nitro, silyl, sulfo-oxo, or thiol as described herein.

The terms "alkoxy" and "alkoxyl" as used herein to refer to an alkyl or cycloalkyl group bonded through an ether linkage; that is, an "alkoxy" group can be defined as —$OA^1$ where $A^1$ is alkyl or cycloalkyl as defined above. "Alkoxy" also includes polymers of alkoxy groups as just described; that is, an alkoxy can be a polyether such as —$OA^1$-$OA^2$ or —$OA^1$-$(OA^2)_a$-$OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, i.e., C=O.

The terms "amine" or "amino" as used herein are represented by the formula $NA^1A^2A^3$, where $A^1$, $A^2$, and $A^3$ can be, independently, hydrogen or optionally substituted alkyl, cycloalkyl, alkenyl, cycloalkenyl, alkynyl, cycloalkynyl, aryl, or heteroaryl group as described herein.

The term "carboxylic acid" as used herein is represented by the formula —C(O)OH.

The term "ester" as used herein is represented by the formula —OC(O)$A^1$ or —C(O)O$A^1$, where $A^1$ can be an optionally substituted alkyl, cycloalkyl, alkenyl, cycloalkenyl, alkynyl, cycloalkynyl, aryl, or heteroaryl group as described herein. The term "polyester" as used herein is represented by the formula -($A^1$O(O)C-$A^2$-C(O)O)$_a$— or -($A^1$O(O)C-$A^2$-OC(O))$_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an interger from 1 to 500. "Polyester" is as the term used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an optionally substituted alkyl, cycloalkyl, alkenyl, cycloalkenyl, alkynyl, cycloalkynyl, aryl, or heteroaryl group described herein. The term "polyether" as used herein is represented by the formula -($A^1$O-$A^2$O)$_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "halide" as used herein refers to the halogens fluorine, chlorine, bromine, and iodine.

The term "heterocycle," as used herein refers to single and multi-cyclic aromatic or non-aromatic ring systems in which at least one of the ring members is other than carbon. Heterocycle includes pyridinde, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridine, pyridazine, pyrimidine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like.

The term "hydroxyl" as used herein is represented by the formula —OH.

The term "ketone" as used herein is represented by the formula $A^1$C(O)$A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein.

The term "azide" as used herein is represented by the formula —N$_3$.

The term "nitro" as used herein is represented by the formula —NO$_2$.

The term "nitrile" as used herein is represented by the formula —CN.

The term "thiol" as used herein is represented by the formula —SH.

Certain instances of the above defined terms may occur more than once in the structural formulae, and upon such occurrence each term shall be defined independently of the other.

As used herein, the term "effective amount" refers to an amount that is sufficient to achieve the desired result or to have an effect on an undesired condition. For example, a "visually effective amount" refers to an amount that is sufficient to achieve the desired result (i.e., impart color to a composition or an article), but is generally insufficient to cause adverse side affects (e.g., warping of a polymeric article).

The term "leaving group" refers to an atom (or a group of atoms) with electron withdrawing ability that can be displaced as a stable species, taking with it the bonding electrons. Examples of suitable leaving groups include sulfonate esters, including triflate, mesylate, tosylate, brosylate, and halides.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

B. Compositions

The compositions comprise a nonionic colorant harmonizer which advantageously mitigates effects that certain colorants have on oxygen scavenging properties of polymer compositions comprising an oxygen scavenger. Generally, the disclosed polymer composition comprises a base polymer; an amide compound present in an amount of from about 0.10 to about 10 weight percent of the composition; a transition metal in a positive oxidation state, the metal present in an amount of from about 10 ppm to about 400 ppm; a visually effective amount of colorant, and a nonionic colorant harmonizer present in an amount of from about 0.01 to about 10 weight percent of the composition, wherein the composition has an oxygen transmission rate (OTR) of less than about 0.1 cc/pkg/day (for bottles) under standard conditions or less than about 5 cc-mm/m2-day-atm (for films).

1. Base Polymer

A variety of different polymers can be used as the base polymer. The disclosed compositions enable oxygen scavenging, and thus the base polymer generally includes those polymers that can be subject to oxidation. For example, polymers that exhibit at least some oxygen permeability are useful with the disclosed compositions, at least inasmuch as the disclosed compositions can reduce the oxidative damage to the polymer.

The base polymer can be a polymer commonly used in packaging materials including polyethylene, such as low density polyethylene, very low density polyethylene, ultra-low density polyethylene, high density polyethylene, and linear low density polyethylene; polyesters such as (PET), (PEN) and their copolymers such as PET/IP; polyvinyl chloride (PVC); polyvinylidene chloride (PVDC); and ethylene copolymers such as ethylene/vinyl acetate copolymer, ethylene/alkyl (meth)acrylate copolymers, ethylene/(meth) acrylic acid copolymers, and ionomers. Blends of different base polymers also can be used.

In a further aspect, the base polymer can include one or more polymers approved by the U.S. Food and Drug Admistration (FDA). Examples include polyethylene terephthalate, polypropylene, and polyethylene.

In a further aspect, the base polymer comprises a polyester polymer or copolymer. Preferred polyesters include polymers of phthalic acids, such as polyethylene terephthalate (PET), or a copolymer thereof. PET, for example, can be made from terephthalic acid and ethylene glycol. PET can also be made using dimethyl terephthalate and ethylene glycol. Preferred copolymers of phthalic acids include copolymers of a phthalic acid and one or more hydroxylated organic compounds. Examples of suitable hydroxylated organic compounds include 1,4-cyclohexandedimethanol, 1,2-propanediol, 1,4-butanediol, 2,2-dimethyl-1,3-propanediol, 2-methyl -1,3-propanediol (2MPDO), 1,6-hexanediol, 1,2-cyclohexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol, or mixtures of these, and the like.

In a still further aspect, the base polymer includes a polyethylene terephthalate homopolymer and copolymer modified with one or more polycarboxylic acid modifiers in a cumulative amount of less than about 15 mole %, or about 10 mole % or less, or about 8 mole % or less, or one or more hydroxyl compound modifiers in an amount of less than about 60 mol %, or less than about 50 mole %, or less than about 40 mole %, or less than about 15 mole %, or about 10 mole % or less, or about 8 mole % or less and polyethylene naphthalate homopolymers and copolymers modified with a cumulative amount of less than about 15 mole %, or about 10 mole % or less, or about 8 mole % or less, of one or more polycarboxylic acid modifiers or modified with less than about 60 mol %, or less than about 50 mole %, or less than about 40 mole %, or less than about 15 mole %, or about 10 mole % or less, or about 8 mole % or less of one or more hydroxyl compound modifiers, and blends thereof. In some aspects, the base polymer comprises at least 90 mole %, 92 mole %, or 94 mole % ethylene terephthalate repeat units based on the moles of all repeat units in the polyester polymers.

Polyesters such as PET can be prepared by polymerization procedures known in the art sufficient to effect esterification and polycondensation. Polyester melt phase manufacturing processes include direct condensation of a dicarboxylic acid with a diol, optionally in the presence of one or more esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and polymerization in the presence of a polycondensation catalyst.

2. N-Allylic Amide Compound or N-Benzylic Amide Compound

The compositions comprise from about 0.10 to about 10 weight percent of the amide compound. Preferably, the amide compound is an N-allylic amide compound or N-benzylic amide compound. The amide compound can function as an oxygen scavenger in the composition. The oxygen scavenging ability of the amide compound can be enhanced by the transition metal.

N-allylic or N-benzylic amide compounds have the general structure shown below:

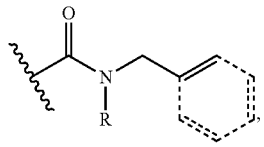

wherein each --- independently denotes an optional covalent bond.

It is also appreciated that an N-allylic or N-benzylic amide compound can be further substituted and that more than one amide functionality can be present in a compound. In one aspect, an N-allylic or N-benzylic amide compound can be polymeric. In a further aspect, an N-allylic or N-benzylic amide compound can be nonpolymeric.

Generally, the amide compound is present in the composition in an amount of from 0.1 to about 10 weight percent. In one aspect, the amide compound is present in the composition in an amount of from 1 to about 10 weight percent. In a further aspect, the amide compound is present in the composition in an amount of from 1 to about 5 weight percent. In a further aspect, the amide compound is present in the composition in an amount of from 1 to about 3 weight percent.

In one aspect, the amide compound has a structure of Formula I:

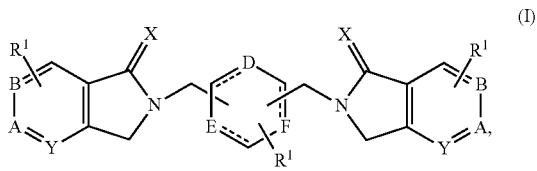

wherein each X is selected from the group consisting of O, S, and NH; wherein each Y, each A, and each B are independently selected from the group consisting of N and $CR^1$; wherein D, E, and F are independently selected from the group consisting of CH, N, O, and S; wherein the symbol --- when used in conjunction with a bond line represents a single or a double bond; and wherein each $R^1$ is independently selected from the group consisting of H, alkyl, aryl, electron withdrawing groups, and electron releasing groups.

In a further aspect, the amide compound has a structure of Formula II:

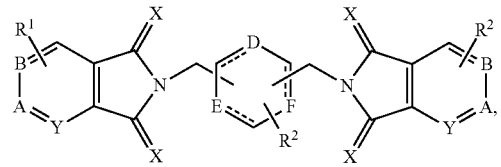

wherein each X is selected from the group consisting of O, S, and NH; wherein each Y, each A, and each B are independently selected from the group consisting of N and $CR^2$; wherein D, E, and F are independently selected from the group consisting of CH, N, O, and S; wherein the symbol --- when used in conjunction with a bond line represents a single or a double bond; and wherein each $R^2$ is independently selected from the group consisting of H, alkyl, aryl, electron withdrawing groups, and electron releasing groups.

The alkyl group of Formula (I) or (II) can be a branched or unbranched saturated hydrocarbon group of 1 to 24 carbon atoms, e.g. 1 to 18 carbons atoms, 1 to 14 carbon atoms, 1 to 12 carbon atoms, 1 to 10 carbon atoms, 1 to 8, 1 to 6 carbon atoms, or 1 to 4 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. The alkyl group can be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, halide, hydroxamate, hydroxy, ketone, nitro, silyl, sulfo-oxo, sulfonyl, sulfone, sulfoxide, or thiol, as described below. The alkyl group can be halogenated, which includes an alkyl group that is substituted with one or more halide, e.g., fluorine, chlorine, bromine, or iodine. The alkyl group can also be a lower alkyl group, which is an alkyl group containing from one to six (e.g., from one to four) carbon atoms.

The aryl group of Formula (I) or (II) can be any carbon-based aromatic group including but not limited to, benzene, naphthalene, phenyl, biphenyl, etc. The aryl group can also be heteroaryl, which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, halide, hydroxamate, hydroxy, ketone, nitro, silyl, sulfo-oxo, sulfonyl, sulfone, sulfoxide, or thiol as described herein. A biaryl group is a specific type of aryl group and is included in the definition of aryl. Biaryl refers to two aryl groups that are bound together via a fused ring structure, as in naphthalene, or are attached via one or more carbon-carbon bonds, as in biphenyl.

Suitable electron withdrawing groups and electron releasing groups are generally known in the art. Preferred electron withdrawing groups include nitro, carboxylic acid, esters, for example loweralkyl esters, and cyano. Preferred electron releasing groups include branched and straight chain alkyl groups, for example, methyl, ethyl, propyl, isopropyl, butyl, isobutyl, and tert-butyl. Other preferred electron releasing groups include alkoxy, for example methoxy and ethoxy. Other preferred electron releasing groups include thioalkyl.

Still other preferred electron releasing groups include amines, for example —NH$_2$, and NH(loweralkyl), and N(loweralkyl)$_2$.

Preferred amide compounds of Formula (I) and (II) are disclosed in U.S. Patent Application Publication No. 20080277622, Deshpande et al. "Oxygen Scavenging Molecules, Articles Containing Same, And Methods of Their Use," which is incorporated herein by this reference for its teaching of amide compounds, their preparation, and their use as oxygen scavenging materials.

In a further aspect, the amide compound is polymeric or copolymeric and comprises a structure of Formula III:

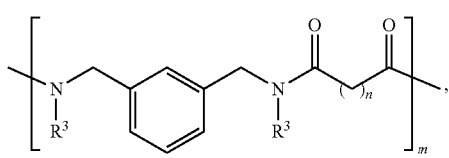

(III)

wherein m is a positive integer greater than 10; wherein n is an integer from 1 to 6; and wherein R$^3$ is H or C1-C4 alkyl. The C1-C4 alkyl group can be substituted or unsubstituted methyl, ethyl, propyl, butyl, isopropyl, or isobutyl. In a further aspect, R$^3$ is H. In one aspect, n is 4. One example of a compound of Formula III is MXD6 (available commercially, e.g., from Mitsubishi Gas Chemicals of Japan). MXD6 is a polymer produced by condensation of meta-xylylene diamine and adipic acid. Compounds of Formula III can be obtained from commercial sources or be prepared by polymerization methods known in the art. Exemplary commercially available grades include, for example, HB-5299 from EMS Grivory of Sumter, South Carolina USA, or products 6001, 6003, 6007 and 6121 from Mitsubishi Gas Chemical America, Inc. a wholly owned subsidiary of Mitsubishi Gas Chemical Company, Inc. of Tokyo, Japan.

In one aspect, the amide compound has a structure of Formula I: the amide compound has a structure represented by a formula:

E-(L-E)$_x$ wherein x is 0, 1, or 2; wherein E has a structure of Formula IV or Formula V:

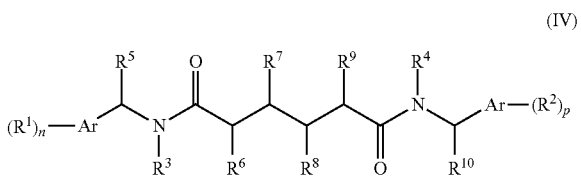

(IV)

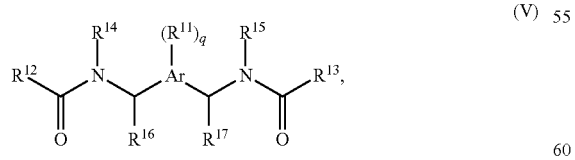

(V)

wherein L is a linking group of the formula —O—R$^{21}$)$_z$—O—, —(NH—R$^{21}$)$_z$—NH—, —(NH—C(=O)R$^{22}$)$_t$—NH, —NH—R$^{25}$—NH(C(=O)R$^{26}$NHR$^{25}$NH)$_u$, —O—R$^{23}$—O—(R$^{24}$—C(=O)—))$_s$— where L is attached to a carbon atom of at least one Ar in Formula IV or where R$^{12}$ and/or R$^{13}$ of Formula V is L; wherein Ar is aryl or heteroaryl;

wherein R$^1$, R$^2$, and R$^{11}$ are each independently, H, C$_1$-C$_{12}$ alkyl, C$_1$-C$_6$ alkoxy, C$_6$-C$_{20}$ aryloxy, hydroxy, C$_2$-C$_6$ alkenyl, NR$^{19}$R$^{20}$, acetyl, nitro, glyceryl, carbohydrate, —C(=O)H, L, or two R$^1$ or two R$^2$ groups can form a group of the formula —O—R$^{18}$—O; R$^3$, R$^4$, R$^{14}$, and R$^{15}$ are each H; R$^5$ to R$^{10}$ and R$^{16}$, and R$^{17}$ are each, independently, H or C$_1$-C$_3$ alkyl; R$^{12}$ and R$^{13}$ are each, independently, H, C$_1$-C$_6$ alkyl, C$_6$-C$_{20}$ aryl, C$_1$-C$_6$ alkoxy, or L; wherein R$^{18}$ is C$_2$-C$_6$ alkyl; R$^{19}$ and R$^{20}$ are each, independently, H, C$_1$-C$_6$ alkyl, or C$_6$-C$_{20}$ aryl; wherein R$^2$, and R$^{24}$ are each, independently, C$_1$-C$_6$ alkyl; wherein R$^{22}$, R$^{23}$, R$^{25}$ and R$^{26}$ are each, independently, C$_1$-C$_6$ alkyl or C$_6$-C$_{20}$ aryl; wherein n and p are independently 0 or an integer from 1 to 5; wherein q is 0 or an integer from 1 to 4; wherein s and z are independently 1, 2, or 3; and wherein t and u are independently 1 or 2.

In a further aspect, E has a structure of Formula IV:

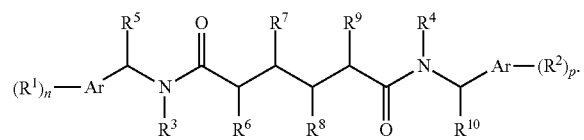

(IV)

In a further aspect, the amide compound has a structure represented by a formula:

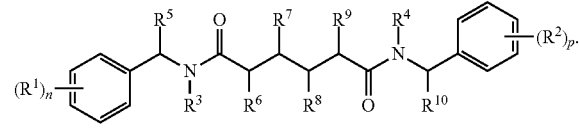

In a further aspect, n and p are each 0, 1, or 2 and R1 and R$^2$ are each independently H, C$_1$-C$_4$ alkyl, hydroxy, C$_1$-C$_3$ alkoxy, or carbohydrate. In a further aspect, R$^1$ and R$^2$ are each independently H, methyl, ethyl, hydroxy, methoxy, ethoxy, or glucose. In a further aspect, R$^5$ to R$^{10}$ are each H. In a further aspect, R$^1$ and R$^2$ are each H. In a further aspect, the amide compound has a structure represented by a formula:

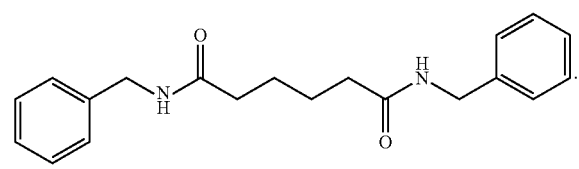 [SMILES: O=C(CCCCC(=O)NCc1ccccc1)NCc1ccccc1]

In a further aspect, E has a structure of Formula V:

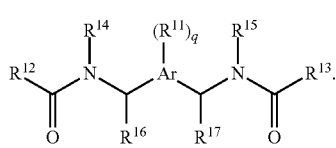

(V)

In a further aspect, the amide compound has a structure represented by a formula:

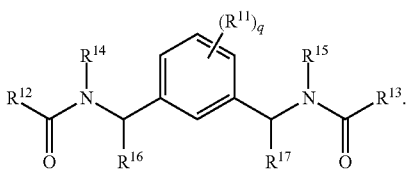

In a further aspect, $R^{16}$ and $R^{17}$ are H. In a further aspect, each $R^{11}$ is independently H, $C_1$-$C_4$ alkyl, hydroxy, or $C_1$-$C_3$ alkoxy, or carbohydrate. In a further aspect, each $R^{11}$ is independently H, methyl, ethyl, hydroxy, methoxy, or ethoxy. In a further aspect, the amide compound has a structure represented by a formula:

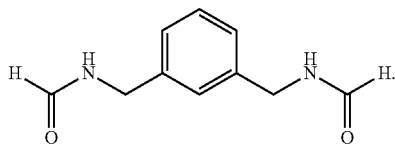

Preferred amide compounds of Formula (IV) and (V) are disclosed in U.S. Patent Application Publication No. 20060180790, Deshpande et al. "Oxygen scavenging compositions and packaging comprising said compositions," which is incorporated herein by this reference for its teaching of amide compounds, their preparation, and their use as oxygen scavenging materials.

3. Transition Metal

The amide compound can in certain aspects be complexed to the transition metal of the composition. For example, the amide compound can be complexed to the transition metal through one or more aryl groups, for example through pi-cloud complexation. The amide compound can also be polymerized via complexation to the transition metal.

The composition comprises the transition metal in a positive oxidation state. The transition metal enhances the oxygen scavenging properties of the amide compound. Amounts of transition metal in the composition can be greater than zero and can be up to 5000 ppm. Generally, the transition metal will be present in an amount of from about 10 ppm to about 400 ppm. In one aspect, about 200 ppm of the transition metal is present. In a further aspect, about 250 ppm of the transition metal is present. In wall applications (as opposed to master batch applications where more transition metal is used), it can be preferred to keep the level of metal below 300, more preferably 250 ppm. In a further aspect, the transition metal is present from 30 to 150 ppm. In a further aspect, about 50 ppm of the transition metal is present. In a further aspect, about 100 ppm of the transition metal is present. In a further aspect, about 150 ppm of the transition metal is present.

In one aspect, the transition metal can be a transition metal from the first, second, or third transition series of the Periodic Table. The metal can be Rh, Ru, or one of the elements in the series of Sc to Zn (e.g., Sc, Ti, V, Cr, Mn, Fe, Co, Ni, Cu, and Zn). In one aspect, the transition metal is cobalt. Cobalt can be used in +2 or +3 oxidation states. In some aspects, it is preferred to use cobalt in the +2 oxidation state. In a further aspect, the transition metal is rhodium. For example, rhodium in the +2 oxidation state can be used. The transition metal can also be a positive oxidation form of zinc.

The transition metal can be present as a salt. The cation of the salt can be the transition metal in a positive oxidation state. A variety of anions can stabilize the positively charged transition metal. Suitable anions for the salts include, but are not limited to, chloride, acetate, oleate, stearate, palmitate, 2-ethylhexanoate, carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, dioxides, hydroxides, nitrates, phosphates, sulfates, or silicates, among others. Representative transition metal salts include cobalt (II) 2-ethylhexanoate, cobalt oleate, and cobalt (II) neodecanoate. The transition metal salt also can be an ionomer, in which case a polymeric counter ion can be present.

4. Colorant

The composition comprises the colorant in a visually effective amount. A visually effective amount refers to an amount of colorant that results in the composition or an article made therefrom appear colored to the naked eye. A composition comprising a visually effective amount of colorant can refer to a composition having at least 0.1% by weight colorant. In a further aspect, the composition can comprise at least 0.25% by weight colorant. In a still further aspect, the composition can comprise at least 0.5% by weight colorant. The compositions can comprise up to about 2% by weight colorant.

A visually effective amount can be determined, for example, by performing a spectrophotometric scan of the composition or article using a wavelength range from 400 to 700 nm (visible region). Specific colors can be characterized according to their spectral pattern. Every color also has its own characteristic L (lightness gradation), a (red to green) and b (yellow to blue) numbers, which can be used to characterize the compositions and articles.

The colorant can be a variety of pigments and dyes, many of which are commercially available. Examples of colorants include without limitation COLORMATRIX Dark Amber, product code: 189-10034-6, COLORMATRIX Dead Leaf Green, product codes: 284-2801-3 and 84-2801-1, AMERICHEM amber, product code: 59108-CD1, Champaigne green, and COLORMATRIX amber, product code: 189-10100-1.

5. Nonionic Colorant Harmonizer

The composition comprises the nonionic colorant harmonizer in an amount of from about 0.10 to about 10 weight percent of the composition. Without wishing to be bound by theory, it is believed that the nonionic colorant harmonizer affects the ability of the colorant to interfere with the oxygen scavenging amide compound, thereby allowing the amide compound to better scavence oxygen in the presence of the transition metal, relative to instances wherein the colorant harmonizer is not present in the composition.

In one aspect, a nonionic colorant harmonizer is a substance used in an oxygen scavenging composition that minimizes or eliminates negative impact of a colorant on the oxygen scavenging activity of the composition. Typically, a nonionic colorant harmonizer provides a Catalyst Deactivation Factor* (CDF*; as defined herein) for a given colorant of less than about 0.75, for example, of less than about 0.5 or of less than about 0.25. In certain aspects, a nonionic colorant harmonizer provides a Catalyst Deactivation Factor* (CDF*; as defined herein) for a given colorant of less than about 0.75, for example, of less than about 0.5 or of less than about 0.25, while an otherwise identical composition in the absence of the nonionic colorant harmonizer exhibits a Catalyst Deactivation Factor (CDF; defined in WO/2006/023583 and described herein) of greater than 0.25.

Preferable colorant harmonizers are those that are adequately soluble in the base polymer, such that the colorant harmonizer does not result in too much undesirable haze in the final article. For food packaging products, it is preferable for the colorant harmonizer to be FDA approved for direct food contact.

The colorant harmonizer can be an aliphatic ester having from 6 to 24 carbons. Non-limiting examples of colorant harmonizers include triacetin, tributyrin, dodecyl actetate, methyl linoleate, glyceryl tribenzoate, stearyl stearate, behenyl behenate, ethylene glycol distearate, ethyl behenate, behenyl acetate, palmityl myristate, palmityl palmate, polyethylene glycol stearate, polyethylene glycol di-2-ethyl-hexanoate.

In a further aspect, the colorant harmonizer can be a polyglycerin esterified by various hydrophillic acids such as caproic acid, enanthylic acid, caprylic acid, nonanoic acid, capric acid, octylic acid, lauric acid, myristic acid, behenic acid, palmitic acid, isostearic acid, stearic acid, oleic acid, isononanoic acid and arachic acid.

6. Other Components

The composition can include other components such as fillers, crystallization aids, impact modifiers, surface lubricants, denesting agents, stabilizers, ultraviolet light absorbing agents, metal deactivators, nucleating agents such as polyethylene and polypropylene, phosphate stabilizers and dyestuffs. Typically, the total quantity of such components will be less than about 10% by weight of the composition. In some embodiments, the amount of these optional components is less than about 5% by weight of the composition.

The composition can comprise a reheat additive. Reheat additives are commonly used in the manufacture of polyester polymer compositions used to make stretch blow molded bottles because the preforms made from the composition must be reheated prior to entering the mold for stretch blowing into a bottle. Any conventional reheat additive can be used, such as various forms of black particles, e.g., carbon black, activated carbon, black iron oxide, glassy carbon, silicon carbide, gray particles such as antimony, and other reheat additives such as silicas, red iron oxide, and the like.

The composition can also comprise an impact modifier. Examples of typical impact modifiers useful in the composition include ethylene/acrylate/glycidyl terpolymers and ethylene/acrylate copolymers in which the acrylate is a methyl or ethyl acrylate or methyl or ethyl methacrylate or the corresponding butyl acrylates, styrene based block copolymers, and various acrylic core/shell type impact modifiers. The impact modifiers can be used in conventional amounts from about 0.1 to about 25 weight percent of the overall composition and, in some aspects, in amounts from about 0.1 to about 10 weight percent of the composition.

In many applications, not only are the packaging contents sensitive to the ingress of oxygen, but the contents may also be affected by IN light. Fruit juices and pharmaceuticals are two examples of such contents. Accordingly, in some aspects, it is desirable to incorporate into the composition a UV absorbing compound in an amount effective to protect the packaged contents.

7. Oxygen Transmission Rate

The composition or an article made therefrom preferably has an Oxygen Transmission Rate (OTR) of less than about 0.1 (units of cc/pkg/day or 1-5 cc-mm/m$^2$-day-atm) under standard conditions. In a further aspect, the OTR can be less than 0.03, less than 0.01, less than 0.005, or less than 0.001.

The OTR is a measure of how well the amide compound functions at scavenging oxygen that permeates the composition or article.

When OTR is expressed for a given composition or article, the units "cc/package/day" ("cc/pkg/day") are typically employed. The term package refers to a barrier between an atmosphere of relatively lower oxygen content and an atomosphere of relatively higher oxygen content. Typical barriers (e.g., packages) include bottles, thermo-formed containers, and films (e.g., shrink wrap).

Oxygen Transmission Rate (oxygen permeation) can be measured, for example, as described in U.S. Pat. No. 5,021,515. A material of area A can be exposed to a partial pressure p of oxygen on the one side and to an essentially zero partial pressure of oxygen on the other side. The quantity of oxygen emerging on the latter side is measured and expressed as a volume rate dV/dt, the volume being converted to some standard condition of temperature and pressure. After a certain time of exposure (usually a period of a few days) dV/dt is generally found to stabilize, and a $P_W$ value can be calculated from equation below.

$$dV/dt = P_W A p \quad (1)$$

$P_W$ refers to the permeance of the wall. (Analogy with magnetic permeance and electrical conductance would suggest that $P_W$ should be described as "permeance per unit area", but we are following the nomenclature in Encyclopaedia of Polymer Science and Technology, Vol. 2, Wiley Interscience, 1985, page 178.) The standard conditions for expressing dV/dt are 0° C. and 1 atm (1 atm=101 325 Nm$^{-2}$). If the thickness of the area of wall is substantially constant over the area A with value T and the wall is uniform through the thickness (i.e., the wall is not a laminated or coated one) then the permeability of the material in the direction normal to the wall is calculated from the equation below.

$$dV/dt = P_M A p / T \quad (2)$$

For non-scavenging materials, $P_W$ and $P_M$ are to a reasonable approximation independent of t and p, and $P_M$ of T although they are often appreciably dependent on other conditions of the measurement such as the humidity of the atmosphere on the oxygen-rich side and the temperature of the measurement.

For oxygen-scavenging walls, $P_W$ and $P_M$ are functions of t because the concentrations and activity of scavenger vary with time (particularly as the scavenger is consumed). This typically does not prevent measurement of $P_W$ and $P_M$ reasonably accurately as a function of time, because the changes in dV/dt are relatively gradual once the normal initial equilibration period of a few days is over. After a few days' exposure to the measurement conditions, however, a non-scavenging material typically achieves a steady state in which dV/dt is equal to the rate of oxygen ingress to the wall, while a scavenging material achieves an (almost) steady state in which dV/dt is considerably less than the rate of oxygen ingress to the material. This being the case, it is likely that $P_W$ calculated from (1) is a function of p as well as of t and that $P_M$ in (2) is a function of p and T as well as of t. $P_W$ and $P_M$ for scavenging materials are, strictly speaking, not true permeances and permeabilities at all (since permeation and scavenging are occurring simultaneously) but, rather, apparent ones.

Values of $P_W$ and $P_M$ (except where stated otherwise) are to be understood to refer to conditions in which p=0.21 atm, the relative humidity on the oxygen-rich side of the wall is 50%, the temperature is 23° C. and (in the case of $P_M$ values)

the thickness of the material of about 0.45 mm. Conditions close to the first three of these, at least, are conventional in the packaging industry.

For example, OTR can be measured for bottles, for example, by controlling the atmosphere on both sides of a sample of bottles and measuring the rate of oxygen permeation over time. Typically, the bottles are mounted on a plate such that there are two ports for gas inlet and outlet. The interior of the bottles is separated from the exterior by an air tight seal. After sealing, the interior of the bottle is flushed with $N_2$ gas (or $N_2+H_2$ mixture) to remove any oxygen present before mounting on plate. The bottle is then placed in a controlled environmental chamber (maintained at 23° C. and 50% RH) such that the exterior of the bottle is at standard atmosphere with ~21% oxygen. The interior of the bottle is continuously flushed with $N_2$ (or $N_2+H_2$) at a known gas flow rate. The outlet of the flushed gases contains oxygen permeating through the bottle wall. This flushed gas from the bottle interior is passed over a sensor that is calibrated to measure oxygen content of the flushed gas. Such measurements of oxygen content are made continously over time until a steady state is reached. This steady state value is typically reported as Oxygen Transmission Rate (OTR) for that bottle in the units of cc/package/day. A preferred OTR for PET bottles is less than 0.1 cc/package/day; more preferred is less than 0.01 cc/package/day; most preferred for PET bottles is less than 0.001 cc/package/day over the shelf life of the packaged product.

In one aspect, a disclosed composition has an OTR of less than that of an otherwise identical composition in the absence of the amide compound, the transition metal, and the nonionic colorant harmonizer. In further aspects, a disclosed composition has an OTR of less than about 75%, less than about 50%, less than about 25%, less than about 20%, less than about 10%, less than about 5%, or less than about 1% of an otherwise identical composition in the absence of the amide compound, the transition metal, and the nonionic colorant harmonizer.

8. Catalyst Deactivation Factor (CDF)

Tests such as the Catalyst Deactivation Factor (CDF) test can be used to evaluate the components oxygen scavenging compositions. The CDF has been used to evaluate colorants based on compabilitily, or lack thereof, with oxygen scavenging compositions. Thus, the CDF test can be used to determine whether or not a colorant will interfere with the oxygen scavenging ability of an oxygen scavenger. For example, compositions disclosed in WO/2006/023583 are formulated based on CDF tests, wherein the CDF is required to be less than 0.25. In contrast, the disclosed compositions are not restricted to a particular CDF at least because the compositions include a colorant harmonizer, which enables, inter alia, the use of colorants that would otherwise interfere with the oxygen scavenging amide compound in the absence of the colorant harmonizer.

It will be appreciated however, that the components of the disclosed compositions can be selected based on a CDF evaluation of an otherwise identical composition, in the absence of colorant harmonizer, which exhibits any CDF, including those exhibiting a CDF of 0.25 or greater, or 0.5 or greater. The colorant, particularly, can be selected based on results of CDF tests of the otherwise substantially identical composition. If the CDF is desirable, then the constituents of the otherwise identical composition can be used in a formulation that includes the nonionic colorant harmonizer.

The Catalyst Deactivation Factor is discussed in WO/2006/023583, which is incorporated herein by this reference for its teaching of CDF. As used herein in reference to a disclosed composition, the Catalyst Deactivation Factor refers to: [oxygen permeability of (base polymer+amide compound+transition metal+0.25 weight % colorant)]/[oxygen permeability of (base polymer+amide compound)]. The composition to be measured for the numerator does not include the nonionic colorant harmonizer.

9. CDF*

A similar test for selecting the colorant and/or the nonionic colorant harmonizer of the composition is the Catalyst Deactivation Factor* (CDF*). CDF*, as used herein, refers to [oxygen permeability of (base polymer+amide compound+transition metal+0.25 weight % colorant+nonionic colorant harmonizer)]/[oxygen permeability of (base polymer+amide compound+nonionic colorant harmonizer)]. In one aspect, the colorant and the nonionic colorant harmonizer are selected such that the composition exhibits a CDF* of less than about 0.75. In a further aspect, the colorant and the nonionic colorant harmonizer are selected such that the composition exhibits a CDF* of less than about 0.5. In a still further aspect, the colorant and the nonionic colorant harmonizer are selected such that the composition exhibits a CDF* of less than about 0.25.

To determine CDF or CDF*, measurements of oxygen permeability can be performed by any method known in the art, as long as the test is consistent between the compositions of the numerator and denominator. A particular catalyst deactivation ratio (CDF or CDF*) should remain relatively consistent regardless of which oxygen permeability test is used.

For example, measurements of oxygen permeation can be made by methods described, for example, in U.S. Pat. No. 5,639,815, which is incorporated herein by this reference for its teachings of oxygen permeability tests. Oxygen permeability tests are also discussed in U.S. Pat. Nos. 5,021,515, 5,034,252, 5,049,624, 5,159,005, 5,239,016, 5,639,815, 5,955,527, and U.S. Application Publication No. 2006/0180790, each of which is incorporated herein by this reference for its teaching of oxygen permeability tests. Oxygen permeability tests can also be carried out according to the method disclosed in WO2006/023583 at page 10.

Based on the above catalyst deactivation ratios (CDF or CDF*), a variety of colorants can be selected for use with the compositions. For example, any of the colorants listed on page 12 of WO/2006/023583 can be used, including those that result in a CDF of 0.25 or greater, such as Solvent Red 135 (Perinone dye) (CDF 0.374), Solvent Brown 53 (Azomethine dye) (CDF 0.421), Solvent Yellow 93 (Methine dye) (CDF 0.431), Pigment Blue 15:3 (Phthalocyanine pigment) (CDF 0.797), Solvent Green 3 (Anthraquinone dye) (CDF 1.000), or Solvent Blue 67 (Phthalocyanine pigment) (CDF 1.000).

C. Methods of Making

Various methods exist for making the composition. In one aspect, the composition can be made by mixing the base polymer with the amide compound, the transition metal, the colorant, and the colorant harmonizer. In some aspects, some or part of the transition metal may already be present in the base polymer prior to mixing, for example if the transition metal is used as a catalyst for making the base polymer. In some aspects, the base polymer, the oxidizable organic component and the transition metal are mixed by tumbling in a hopper. Other optional ingredients can be added during this mixing process or added to the mixture after the aforementioned mixing or to an individual component prior to the aforementioned mixing step.

When melt processing is desired for the composition, the composition can also be made by adding each ingredient separately and mixing the ingredients just prior melt processing the composition to form an article. In some embodiments, the mixing can be just prior to the melt process zone. In other embodiments, one or more ingredients can be premixed in a separate step prior to bringing all of the ingredients together.

In some aspects, the transition metal can be added neat or in a carrier (such as a liquid or wax) to an extruder or other device for making the article, or the metal can be present in a concentrate or carrier with the amide compound, in a concentrate or carrier with the base polymer, or in a concentrate or carrier with a base polymer/amide compound blend. It is desirable that the addition of the transition metal does not substantially increase the intrinsic viscosity of the melt in the melt processing zone. Thus, transition metal or metals can be added in two or more stages, such as once during the melt phase for the production of the base polymer and again once more to the melting zone for making the article.

The melt blend of base polymer, amide compound, transition metal catalyst, colorant harmonizer, and colorant can also be prepared by adding the components at the throat of an injection molding machine that: (i) produces a preform that can be stretch blow molded into the shape of the container, (ii) produces a film that can be oriented into a packaging film, (iii) produces a sheet that can be thermoformed into a food tray, or (iv) produces an injection molded container. The mixing section of the extruder should be of a design to produce a homogeneous blend. Such process steps work well for forming carbonated soft drink, water or beer bottles, packaging films and thermoformed trays. The present invention can be employed in any of the conventional known processes for producing a polymeric container, film, tray, or other article that would benefit from oxygen scavenging.

D. Articles

Various articles can be prepared from the disclosed compositions. Thus, the articles prepared from the compositions will also have the composition present in the article. Suitable articles include vessels and films, such as flexible sheet films, flexible bags, pouches, semi-rigid and rigid containers such as bottles (e.g. PET bottles) or metal cans, or combinations thereof. Typical flexible films and bags include those used to package various food items and can be made up of one or a multiplicity of layers to form the overall film or bag-like packaging material. The composition of the present invention can be used in one, some or all of the layers of such packaging material.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (e.g., vitamin degradation), or color of the drink. The compositions are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen. The compositions can also be used in the manufacture of cosmetic containers and containers for pharmaceuticals or medical devices.

Other suitable articles include rigid or semi-rigid articles including plastic, such as those utilized for juices, soft drinks, as well as thermoformed trays or cup normally having thickness in the range of from 100 to 1000 micrometers. The walls of such articles can comprise single or multiple layers of materials. The article can also take the form of a bottle or can, or a crown, cap, crown or cap liner, plastisol or gasket. The composition of the present invention can be used as an integral layer or portion of, or as an external or internal coating or liner of, the formed semi-rigid or rigid packaging article. As a liner, the composition can be extruded as a film along with the rigid article itself, e.g., by coextrusion, extrusion coating, or an extrusion lamination process, so as to form the liner in situ during article production; or alternatively can be adhered by heat and/or pressure, by adhesive, or by any other suitable method.

When the compositions are used in a wall or as a layer of a wall, the permeability of the composition for oxygen is advantageously not more than about 3.0, or about 1.7, or about 0.7, or about 0.2, or about 0.03 $cm^3$-mm/($m^2$-atm-day). In some aspects, the permeability of the composition is not more than about three-quarters of that in the absence of the amide compound. In some aspects, the permeability is not more than about one half, one-tenth in certain embodiments, one twenty-fifth in other embodiments, and not more than one-hundredth of that in the absence of the amide compound.

Although it can be preferable from the standpoint of packaging convenience and/or scavenging effectiveness to employ the present invention as an integral or discrete part of the packaging wall, the invention can also be used as a non-integral component of a packaging article such as, for example, a bottle cap liner, adhesive or non-adhesive sheet insert, sealant, sachet, fibrous mat insert or the like.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

In a further aspect, the composition can be used as a master batch for blending with a polymer or a polymer containing component. In such compositions, the concentration of the amide compound and the transition metal will be high enough to allow for the final blended product to have suitable amounts of these components. The master batch can also contain an amount of the base polymer with which the master batch is blended.

Oxygen permeability of an article can be maintained for a longer period of time by storing the article in a sealed container or under an inert atmosphere such as nitrogen prior to use with oxygen sensitive materials.

The articles can be made by various methods known in the art. Generally, the articles are prepared by melt processing methods (i.e., a melt of the composition). Such processes generally include injection molding, stretch blow molding, extrusion, thermoforming, extrusion blow molding, and (specifically for multilayer structures) co-extrusion and lamination using adhesive tie layers. Orientation, e.g., by stretch blow molding, of the polymer can be used with phthalate polyesters because of the known mechanical advantages that result.

The melt processing zone for making the article can be operated under customary conditions effective for making the intended articles, such as preforms, bottles, trays, and other articles mentioned above. In one aspect, such conditions are effective to process the melt without substantially increasing the intrinsic viscosity of the melt and which are ineffective at promoting transesterification reactions. In some preferred aspects, suitable operating conditions effective to establish a physical blend of the base polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig (pound-force per square inch gauge) to about 900 psig. In some embodiments, the residence time of the melt on the screw can range from about 1 to about 4 minutes.

E. Experimental

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Example 1

A 36.8 gram, 43 mm preform was molded on 2-cavity Husky LX 160 injection molding machine. Eastman Chemical's Heatwave CF746 was used as the PET resin. MXD6 nylon was obtained from Mitsubishi Gas and Chemical Company. Cobalt Neodecanoate was used as catalyst in a PET-based masterbatch. Amber colorant was obtained from ColorMatrix Corporation, as product grade 189-10034-6. A colorant harmonizer (e.g., fatty acid ester) was used as process aid 80-561-1 from ColorMatrix Corporation. The Heatwave CF746 PET resin was dried in a Piovan drier for 4 hours at 170° C., such that the moisture content at the end of drying was less than 40 ppm. The MXD6 nylon was used as is. The PET based Cobalt masterbatch was also dried till ~150 ppm moisture prior to use.

a. Composition Preparation

The hot, dry base polymer (Heatwave CF746) was physically blended with 3% MXD6 nylon (available for example as HB-5299 from EMS Grivory of Sumter, S.C. USA, or products 6001, 6003, 6007 and 6121 from Mitsubishi Gas Chemical America, Inc. a wholly owned subsidiary of Mitsubishi Gas Chemical Company, Inc. of Tokyo, Japan) and dry PET based Cobalt masterbatch (80 ppm elemental Cobalt) in a bucket.

b. Injection Molding into Preforms

The uniformly mixed blend was added to the feed hopper of Husky LX 160 where it was melt blended in the extruder and injected into monolayer preforms. The Husky LX 160 barrel temperatures were ~265° C. across all zones. The injection pressure was ~530 psi, with back pressures of ~50 psi and screw rpm of ~150.

Similar preforms were made pursuant to the variables as set forth in Table 1.

TABLE 1

| Expt # | Base Poylmer | % MXD6 | Co level (ppm) | % Amber colorant - ColorMatrix 189-10034-6 | % Fatty Acid Ester, ColorMatrix 80-561-1 |
|---|---|---|---|---|---|
| 1 | Heatwave CF 746 | 3 | 80 | 0 | 0 |
| 2 | Heatwave CF 746 | 3 | 160 | 0 | 0 |
| 3 | Heatwave CF 746 | 3 | 80 | 0.18 | 0 |
| 4 | Heatwave CF 746 | 3 | 160 | 0.18 | 0 |
| 5 | Heatwave CF 746 | 3 | 80 | 0.18 | 0.3 |
| 6 | Heatwave CF 746 | 3 | 160 | 0.18 | 0.3 |
| 7 | Heatwave CF 746 | 3 | 80 | 0.18 | 0.4 |
| 8 | Heatwave CF 746 | 3 | 160 | 0.18 | 0.4 |

C. Blow Molding into Bottles

The preforms from experiment 1 through 8 were then blown into 16 ounce bottles on Sidel's SBO 2/3 in a hot mold, 16 days after injection. The mold temperature was 280° F., machine speed was 1600 bottles per hour. The oven IR lamp settings were as indicated in Table 2.

TABLE 2

| Zone | % max | Lamp 1 | Lamp 2 | Lamp 3 |
|---|---|---|---|---|
| 1 (7.5 mm) | 99 | ON | ON | ON |
| 2 (15 mm) | 73 | ON | ON | ON |
| 3 (15 mm) | 40 | ON | OFF | ON |
| 4 (15 mm) | 53 | OFF | OFF | ON |
| 5 (15 mm) | 70 | OFF | OFF | ON | d. Determining Oxygen Permeability

The bottles formed pursuant to experiments 1, 3, 5 and 7 of Table 1 were then tested for oxygen scavenging using oxysense at 40° C. The preforms were ground to fine powder, placed in a sealed glass vial, with a photoluminescent window on the wall. The intensity of light reflected from the photoluminescent window is proportional to the oxygen content in the vial. The oxysense data is shown in FIG. 1.

The bottles from experiments 1 through 8 were measured for Oxygen Transmission Rate (OTR) under standard conditions of 70° F. and 50% RH. Table 3 shows the steady state OTR values in cc/pkg/day for bottles from experiments 1 through 8.

TABLE 3

| Experiment # | Bottle OTR - cc/pkg/day |
|---|---|
| 1 | 0.0003 |
| 2 | 0.0003 |
| 3 | 0.0158 |
| 4 | 0.0323 |
| 5 | 0.0003 |
| 6 | 0.0003 |
| 7 | 0.0003 |
| 8 | 0.0003 |

The oxysense data and the OTR data clearly show that oxygen scavenging is enabled in colored preforms and bottles by the incorporation of a nonionic colorant compatibilizer (e.g., fatty acid ester).

2. Example 2

A 38.9 gram, 38 mm finish preform was molded on 2-cavity Husky LX 160 injection molding machine. Laser+ F57A, available from DAK America, Charlotte, N.C. USA, was used as the PET resin. MXD6 nylon was used at 1.5% LDR or less. Once again, exemplary MXD6 nylon products are available as HB-5299 from EMS Grivory of Sumter, S.C.

USA, or products 6001, 6003, 6007 and 6121 from Mitsubishi Gas Chemical America, Inc. a wholly owned subsidiary of Mitsubishi Gas Chemical Company, Inc. of Tokyo, Japan. Cobalt Neodecanoate was used as catalyst in a PET-based masterbatch such that the final cobalt level is 80 ppm in the preform. Amber colorant was obtained from ColorMatrix Corporation of Berea, Ohio USA, as product grade 189-10034-6. A fatty acid ester was used as process aid 80-561-1 from ColorMatrix Corporation. The DAK America's Laser+ F57A PET resin was dried in a Piovan drier for 4 hours at 170° C., such that the moisture content at the end of drying was less than 40 ppm. The MXD6 nylon was used as is. The PET based Cobalt masterbatch was also dried till ~150 ppm moisture prior to use.

a. Composition Preparation

The hot, dry Laser+ F57A was physically blended with MXD6 nylon and dry PET based Cobalt masterbatch at LDR's shown in the table below.

b. Injection Molding into Preforms

The blend was added to the feed hopper of Husky LX 160 where it was melt blended in the extruder and injected into monolayer preforms. The Husky LX 160 barrel temperatures were ~265° C. across all zones. The injection pressure process conditions were similar to that described in Example 1. Preforms were made pursuant to the variables set forth in Table 4.

TABLE 4

| Expt # | PET | % MXD6 | Co level (ppm) | % Amber colorant - ColorMatrix 189-10034-6 | % Fatty Acid Ester, ColorMatrix 80-561-1 |
|---|---|---|---|---|---|
| 1 | Laser+ F57A | 1.5 | 80 | 0 | 0 |
| 2 | Laser+ F57A | 1.5 | 80 | 0.24 | 0 |
| 3 | Laser+ F57A | 1.5 | 80 | 0.24 | 0.3 |
| 4 | Laser+ F57A | 1.5 | 80 | 0.27 | 0.3 |
| 5 | Laser+ F57A | 1.5 | 80 | 0.24 | 0.2 |
| 6 | Laser+ F57A | 3 | 80 | 0.24 | 0.3 |
| 7 | Laser+ F57A | 0 | 0 | 0 | 0.2 |

C. Blow Molding into Bottles

The preforms from experiment 1 through 7 were then blown into 20 oz. bottles on Sidel's SBO 2/3 in a hot mold, 21 days after injection. The mold temperature was 288° F., machine speed was 1600 bottles per hour. The INT was set at ~106-107° C. by using the oven IR lamp settings as indicated in Table 5.

TABLE 5

| Zone | % max | Lamp 1 | Lamp 2 | Lamp 3 |
|---|---|---|---|---|
| 1 (7.5 mm) | 95 | ON | ON | ON |
| 2 (15 mm) | 72 | ON | ON | ON |
| 3 (15 mm) | 37 | OFF | ON | ON |
| 4 (15 mm) | 48 | OFF | ON | ON |
| 5 (15 mm) | 49 | OFF | ON | ON |
| 6 (15 mm) | 58 | OFF | ON | ON |
| 7 | OFF | OFF | OFF | OFF |
| 8 | 29 | OFF | ON | OFF | d. Determining Oxygen Permeability

Figure 2:
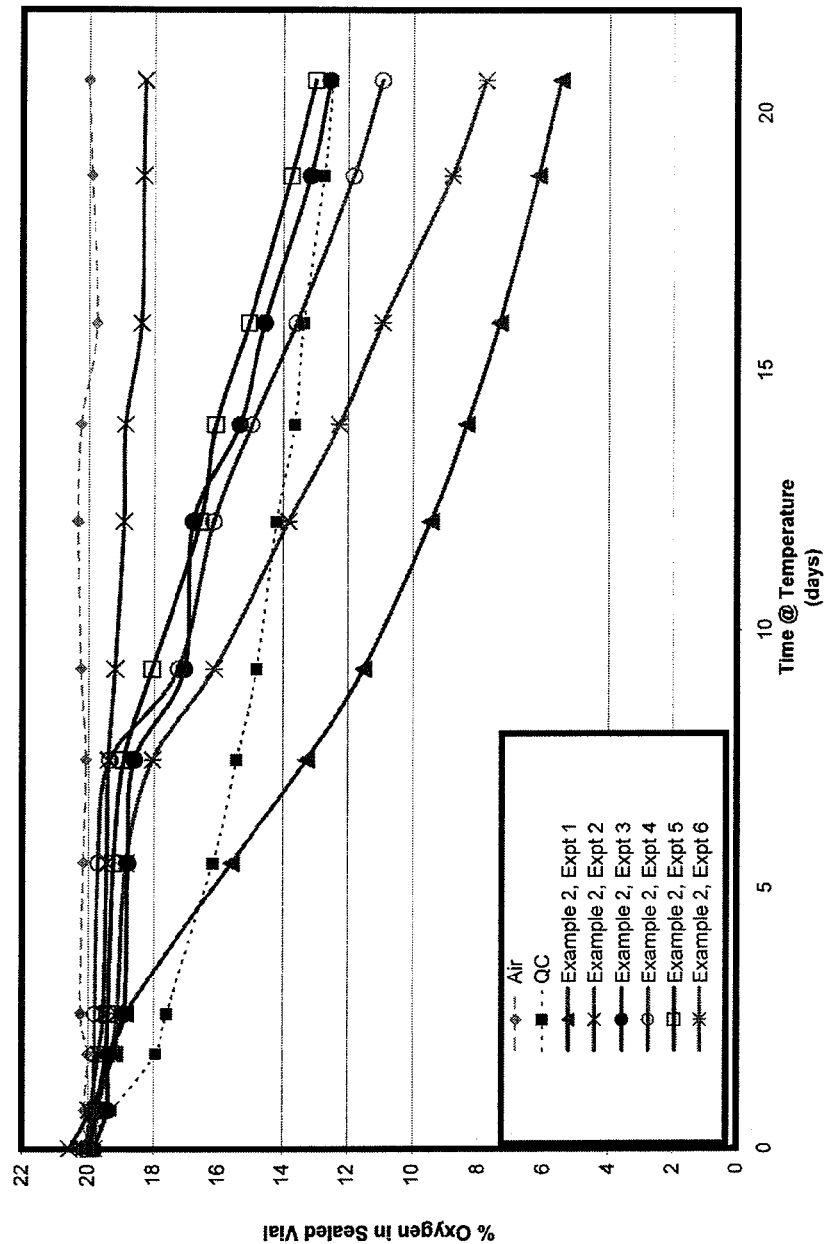
FIG. 2 shows $O_2$ scavenging as a function of time for preforms with and without colorant harmonizer (e.g., fatty acid ester) as exemplified in Example 2.

The bottles formed pursuant to experiments 1 through 6 of Table 4 were then tested for oxygen scavenging using oxysense at 40° C. The preforms were ground to fine powder, placed in a sealed glass vial, with a photoluminescent window on the wall. The intensity of light reflected from the photoluminescent window is proportional to the oxygen content in the vial. The oxysense data is shown in FIG. 2.

The 20 oz. bottles from experiments 1 through 7 of Example 2 were measured for Oxygen Transmission Rate (OTR) under standard laboratory conditions. Table 6 shows the steady state OTR values in cc/pkg/day for bottles from experiment 1 through 7 of this example.

TABLE 6

| Experiment # | Bottle OTR - cc/pkg/day |
|---|---|
| 1 | 0.0003 |
| 2 | 0.0340 |
| 3 | 0.0003 |
| 4 | 0.0003 |
| 5 | 0.0003 |
| 6 | 0.0003 |
| 7 | 0.0391 |

The oxysense data and the OTR data show that oxygen scavenging is enabled in amber colored preforms with MXD6-based $O_2$ scavenger and bottles by the incorporation of a fatty acid ester. Experiment #7 shows that the fatty acid ester does not enable $O_2$ scavenging on its own.

3. Example 3

A 38.9 gram, 38 mm finish preform was molded on 2-cavity Husky LX 160 injection molding machine. DAK America's Laser+ F57A was used as the PET resin. Constar International's DC300 was used as the oxygen scavenger. Cobalt Neodecanoate was used as catalyst in a PET-based masterbatch. Amber colorant was obtained from ColorMatrix Corporation, as product grade 189-10034-6. A fatty acid ester was used as process aid 80-561-1 from ColorMatrix Corporation. The DAK America's Laser+ F57A PET resin was dried in a Piovan drier for 4 hours at 170° C., such that the moisture content at the end of drying was less than 40 ppm. The DC300 scavenger was used as is. The LDR of DC300 was 1.4% in all four experiments of this example. The PET based Cobalt masterbatch was also dried till ~150 ppm moisture prior to use.

a. Composition Preparation

The hot, dry Laser+ F57A was physically blended with DC300 and dry PET based Cobalt masterbatch at LDR's shown in the table below.

b. Injection Molding into Preforms

The blend was added to the feed hopper of Husky LX 160 where it was melt blended in the extruder and injected into monolayer preforms. The Husky LX 160 barrel temperatures were ~265° C. across all zones. The injection pressure process conditions were similar to that described in Example 1. Preforms were made pursuant to the variables set forth in Table 7.

TABLE 7

| Expt # | PET | DC300 content | Co level (ppm) | % Amber colorant - ColorMatrix 189-10034-6 | % Fatty Acid Ester, ColorMatrix 80-561-1 |
|---|---|---|---|---|---|
| 1 | Laser+ F57A | 1.4% | 80 | 0 | 0 |
| 2 | Laser+ F57A | 1.4% | 80 | 0.24 | 0 |
| 3 | Laser+ F57A | 1.4% | 80 | 0.24 | 0.4 |
| 4 | Laser+ F57A | 1.4% | 80 | 0.27 | 0.3 |

C. Blow Molding into Bottles

The preforms from experiment 1 through 4 were then blown into 20 oz. bottles on Sidel's SBO 2/3 in a hot mold, 8 days after injection. The mold temperature was 288° F., machine speed was 1600 bottles per hour. The INT was set at ~106-107° C. by using the oven IR lamp settings as set forth in Table 8.

TABLE 8

| Zone | % max | Lamp 1 | Lamp 2 | Lamp 3 |
|---|---|---|---|---|
| 1 (7.5 mm) | 95 | ON | ON | ON |
| 2 (15 mm) | 72 | ON | ON | ON |
| 3 (15 mm) | 37 | OFF | ON | ON |
| 4 (15 mm) | 48 | OFF | ON | ON |
| 5 (15 mm) | 49 | OFF | ON | ON |
| 6 (15 mm) | 58 | OFF | ON | ON |
| 7 | OFF | OFF | OFF | OFF |
| 8 | 29 | OFF | ON | OFF | d. Determining Oxygen Permeability

Figure 3:
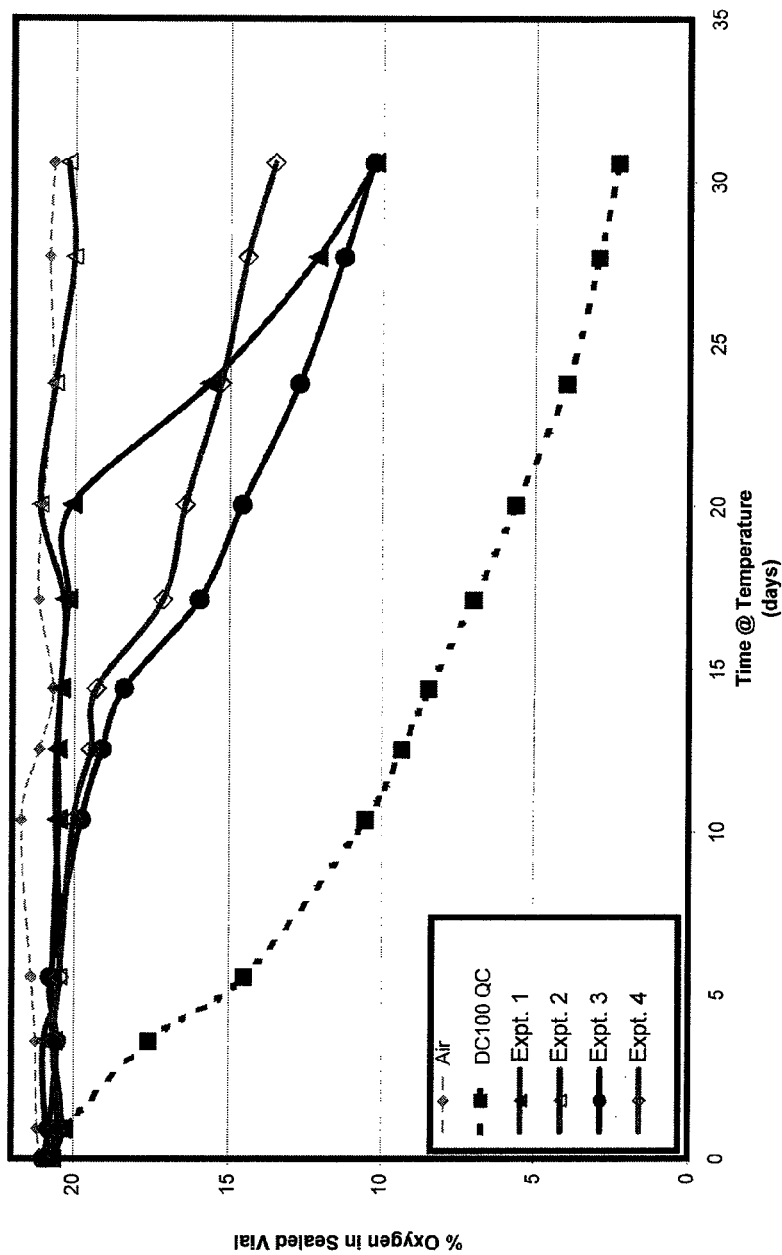
FIG. 3 shows $O_2$ scavenging as a function of time for preforms containing DC300 as $O_2$ scavenger with and without colorant harmonizer (e.g., fatty acid ester) as exemplified in Example 3.

The bottles were then tested for oxygen scavenging using oxysense at 40° C. The preforms were ground to fine powder, placed in a sealed glass vial, with a photoluminescent window on the wall. The intensity of light reflected from the photoluminescent window is proportional to the oxygen content in the vial. The oxysense data is shown in FIG. 3.

The 20 oz. bottles from experiments 1 through 4 of Example 3 were measured for Oxygen Transmission Rate (OTR) under standard laboratory conditions. Table 9 shows the steady state OTR values in cc/pkg/day for bottles from experiment 1 through 4 of this example.

TABLE 9

| Experiment # | Bottle OTR - cc/pkg/day |
|---|---|
| 1 | 0.0003 |
| 2 | 0.0383 |
| 3 | 0.0006 |
| 4 | 0.0007 |

The oxysense data and the OTR data show that oxygen scavenging is enabled in amber colored oxygen scavenging (DC300) preforms and bottles by the incorporation of a colorant harmonizer (e.g., fatty acid ester).

4. Example 4

A 31.5 gram, 38 mm finish preform was molded on 2-cavity Husky LX 160 injection molding machine. DAK America's Laser+ F57A was used as the PET resin. Constar International's DC300 was used as the oxygen scavenger. Cobalt Neodecanoate was used as catalyst in a PET-based masterbatch. Amber colorant was obtained from ColorMatrix Corporation, as product grade 189-10100-1. Fatty acid esters such as Glycerol Monostearate and commercially available products such as Atmer 7510, available from Croda, Inc. of Edison, N.J. USA and ColorMatrix's Process Aid 80-561-1 were also used at different let down ratios. The DAK America's Laser+ F57A PET resin was dried in a Piovan drier for 4 hours at 170° C., such that the moisture content at the end of drying was less than 40 ppm. The DC300 scavenger was used as is. The LDR of DC300 was 1.4% in all 4 experiments of this example. The PET based Cobalt masterbatch was also dried till ~150 ppm moisture prior to use.

a. Composition Preparation

The hot, dry Laser+ F57A was physically blended with DC300 and dry PET based Cobalt masterbatch at LDR's shown in the table below.

b. Injection Molding into Preforms

The blend was added to the feed hopper of Husky LX 160 where it was melt blended in the extruder and injected into monolayer preforms. The Husky LX 160 barrel temperatures were ~270° C. across all zones. The injection pressure process conditions were similar to that described in Example 1. Preforms were made pursuant to the variables set forth in Table 10.

TABLE 10

| Expt # | PET | DC300 content | Co level (ppm) | % Amber colorant - ColorMatrix 189-10100-1 | % Fatty Acid ester used | Fatty acid ester type |
|---|---|---|---|---|---|---|
| 1 | Laser+ F57A | 1.4% | 80 | 0 | 0 | — |
| 2 | Laser+ F57A | 1.4% | 80 | 0.12 | 0 | — |
| 3 | Laser+ F57A | 1.4% | 80 | 0.12 | 0.3% | ColorMatrix 80-561-1 |
| 4 | Laser+ F57A | 1.4% | 80 | 0.12 | 1.5% | Croda Atmer 7510 |
| 5 | Laser+ F57A | 1.4% | 80 | 0.12 | 0.3% | Glycerol Monostearate |

C. Blow Molding into Bottles

The preforms from experiment 1 through 5 were then blown into 16 oz. stock hot-fill bottles on Sidel's SBO 2/3 in a hot mold, 10 days after injection. The bottle blow molding conditions are similar to that described in example 3.

d. Determining Oxygen Permeability

Figure 4:
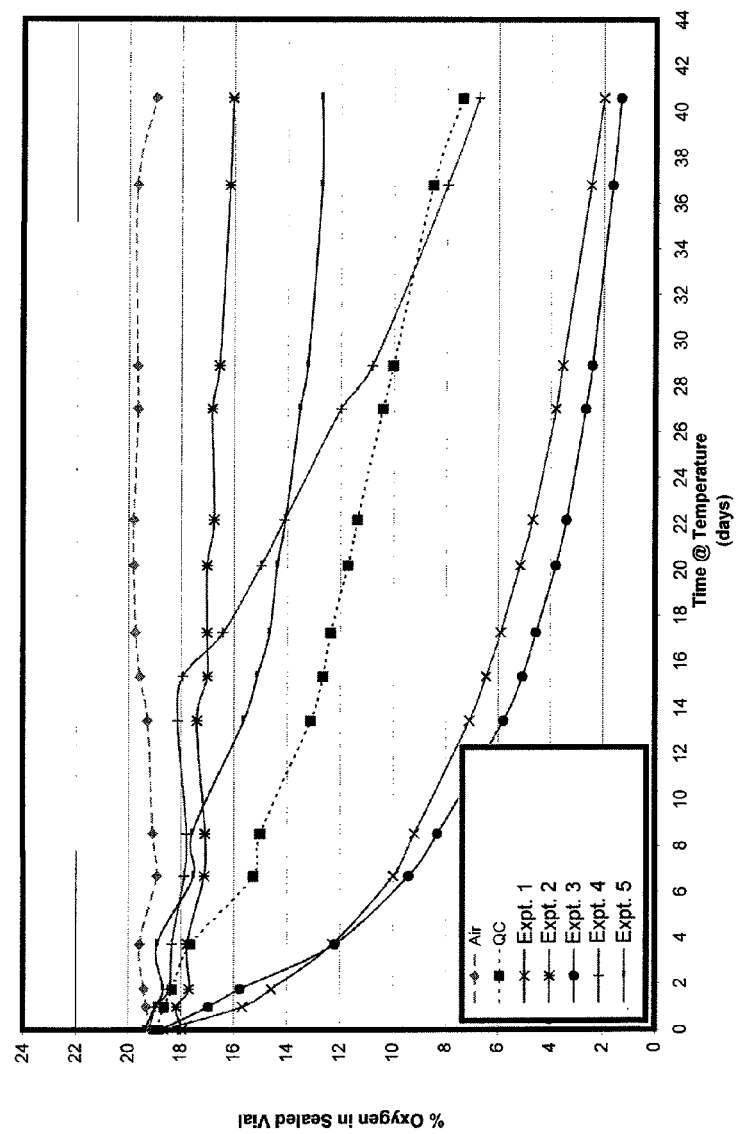
FIG. 4 shows $O_2$ scavenging as a function of time for bottle strips containing DC300 as $O_2$ scavenger with and without colorant harmonizer (e.g. fatty acid ester) as exemplified in Example 4.

The bottles were then tested for oxygen scavenging using oxysense at 40° C. The preforms were ground to fine powder, placed in a sealed glass vial, with a photoluminescent window on the wall. The intensity of light reflected from the photoluminescent window is proportional to the oxygen content in the vial. The oxysense data is shown in FIG. 4.

The 16 oz. bottles from experiments 1 through 5 of Example 4 were measured for Oxygen Transmission Rate (OTR) under standard laboratory conditions. Table 11 shows the steady state OTR values in cc/pkg/day for bottles.

TABLE 11

| Experiment # | Bottle OTR - cc/pkg/day |
|---|---|
| 1 | 0.0003 |
| 2 | 0.0259 |
| 3 | 0.0003 |
| 4 | 0.0008 |
| 5 | 0.0003 |

The oxysense data and the OTR data show that oxygen scavenging is enabled in amber colored oxygen scavenging (DC300) preforms and bottles by the incorporation of a colorant harmonizer (e.g., fatty acid ester).

5. Example 5

Following procedures similar to those described in Examples 1 through 4 above, additional bottles were manufactured from performs comprising PET resin (Eastman's 9921 available from Eastman Chemical Company, Kingsport, Tenn., USA), Oxygen Scavenger DC300 from Constar International at 1.4% LDR, Transition Metal Salt in the form of a cobalt masterbatch at 80 ppm Co level, ColorMatrix Green colorant 284-2801-3 available from ColorMatrix of Berea, Ohio, USA and colorant harmonizer (e.g., fatty acid ester) from ColorMatrix as 80-561-1 at 0.3% LDR. The performs were made pursuant to the formulation variables set forth in Table 12.

TABLE 12

| Expt # | PET | DC300 content | Co level (ppm) | % Green colorant - ColorMatrix 284-2801-3 | % Fatty Acid Ester, ColorMatrix 80-561-1 |
|---|---|---|---|---|---|
| 1 | 9921 | 1.4% | 80 | 0 | 0 |
| 2 | 9921 | 1.4% | 80 | 0.3 | 0 |
| 3 | 9921 | 1.4% | 80 | 0.3 | 0.3 |

Figure 5:
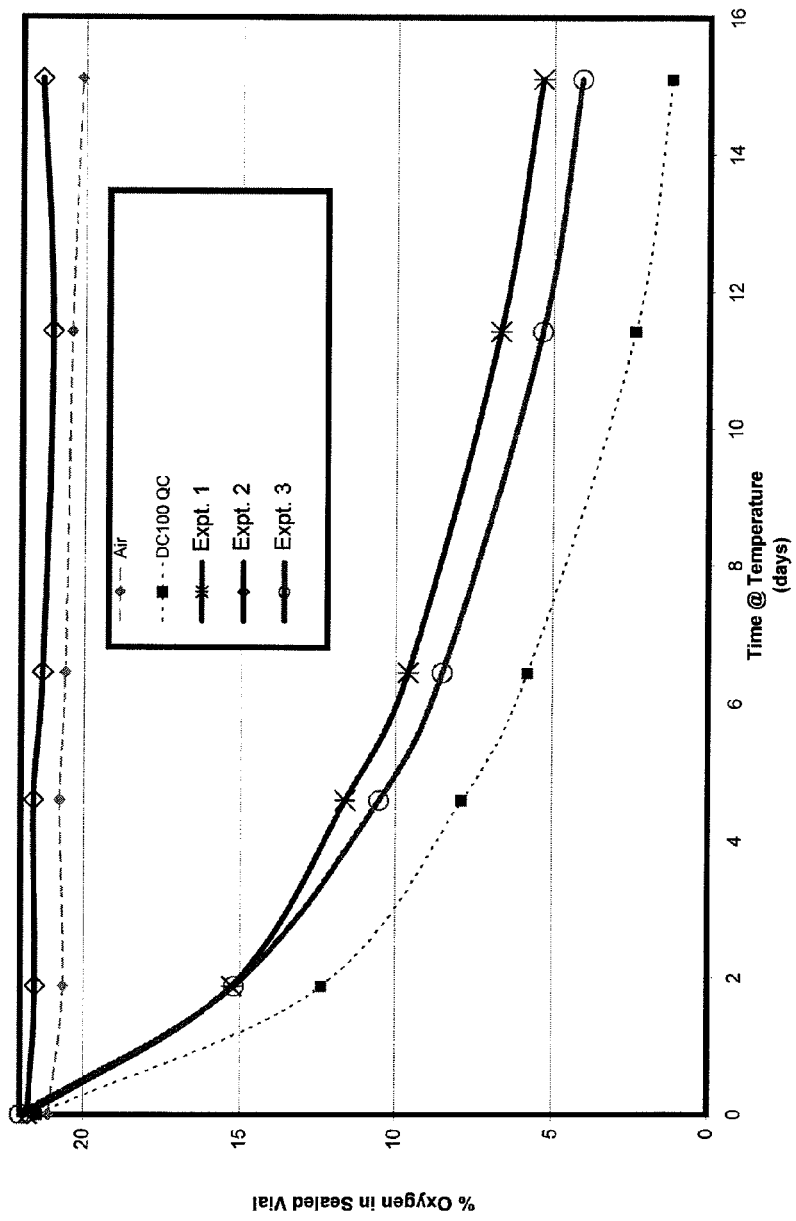
FIG. 5 is a plot of % oxygen in a sealed vial vs. time for a composition comprising PET resin (Eastman Chemical Company's 9921 available from Eastman Chemical Company, Kingsport, Tenn., USA), Oxygen Scavenger DC300 from Constar International, Inc., (Philadelphia, Pa., USA) at 1.4% LDR, Transition Metal Salt in the form of a cobalt masterbatch at 80 ppm Co level, ColorMatrix Green colorant 284-2801-3 available from ColorMatrix of Berea, Ohio, USA and colorant harmonizer (e.g., fatty acid ester) from ColorMatrix as 80-561-1 at 0.3% LDR.

The resulting bottles were then tested for oxygen scavenging using oxysense at 40° C. The data from the oxysense testing is shown in FIG. 5. As illustrated, the oxysense data show that oxygen scavenging is enabled in Process Aid 80-561-1 containing DC300 green wine bottle strips, whereas no O2 scavenging was observed in wine bottle strips without the ColorMatrix Process Aid 80-561-1 colorant harmonizer.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A melt blended polymer composition comprising:
   a. a base polymer;
   b. an N-allylic amide compound or N-benzylic amide compound present in an amount of from about 0.10 to about 10 weight percent of the composition;
   c. a transition metal in a positive oxidation state, the metal present in an amount of from about 10 ppm to about 400 ppm;
   d. a visually effective amount of colorant, and
   e. a nonionic colorant harmonizer present in an amount of from about 0.01 to about 10 weight percent of the composition,
   wherein at least a portion of the polymer and at least a portion of the amide compound are covalently linked by one or more compatibilizing agents, and wherein when formed into an article the composition has an oxygen transmission rate (OTR) of less than about 0.1 cc/package/day.

2. The composition of claim 1, wherein the composition has an OTR of less than about 50% of an otherwise identical composition in the absence of the amide compound, the transition metal, and the nonionic colorant harmonizer.

3. The composition of claim 1, wherein the composition has an OTR of less than about 20% of an otherwise identical composition in the absence of the amide compound, the transition metal, and the nonionic colorant harmonizer.

4. The composition of claim 1, wherein the composition has an OTR of less than about 10% of an otherwise identical composition in the absence of the amide compound, the transition metal, and the nonionic colorant harmonizer.

5. The composition of claim 1, wherein the transition metal is cobalt.

6. The composition of claim 5, wherein the transition metal further comprises zinc.

7. The composition of claim 1, wherein the concentration of transition metal is 30 to 150 ppm.

8. The composition of claim 1, wherein the base polymer comprises a polyester polymer or copolymer.

9. The composition of claim 1, wherein the base polymer comprises polyethylene terephthalate or copolymer thereof.

10. The composition of claim 1, wherein the amide compound is present in an amount of about 1 to about 10 weight percent based on the weight of the composition.

11. The composition of claim 1, wherein the amide compound is present in an amount of about 1 to about 5 weight percent based on the weight of the composition.

12. The composition of claim 1, wherein the amide compound is present in an amount of about 1 to about 3 weight percent based on the weight of the composition.

13. The composition of claim 1, wherein the amide compound has a structure of Formula I:

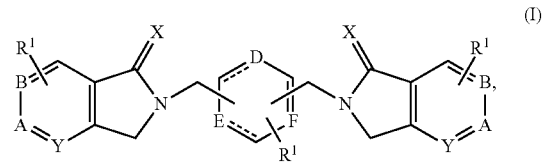

(I)

wherein each X is selected from the group consisting of O, S, and NH;
wherein each Y, each A, and each B are independently selected from the group consisting of N and $CR^1$;
wherein D, E, and F are independently selected from the group consisting of CH, N, O, and S;
wherein the symbol --- when used in conjunction with a bond line represents a single or a double bond; and
wherein each $R^1$ is independently selected from the group consisting of H, alkyl, aryl, electron withdrawing groups, electron releasing groups, and a transition metal.

14. The composition of claim 1, wherein the amide compound has a structure of Formula II:

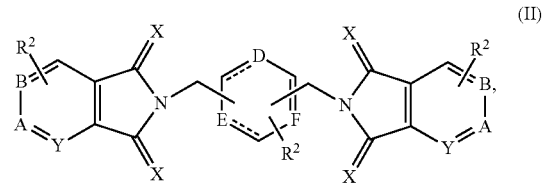

(II)

wherein each X is selected from the group consisting of O, S, and NH;
wherein each Y, each A, and each B are independently selected from the group consisting of N and $CR^2$;

wherein D, E, and F are independently selected from the group consisting of CH, N, O, and S;

wherein the symbol --- when used in conjunction with a bond line represents a single or a double bond; and wherein each $R^2$ is independently selected from the group consisting of H, alkyl, aryl, electron withdrawing groups, electron releasing groups, and a transition metal.

15. The composition of claim 1, wherein the amide compound is polymeric or copolymeric.

16. The composition of claim 1, wherein the amide compound is polymeric or copolymeric and comprises a structure of Formula III:

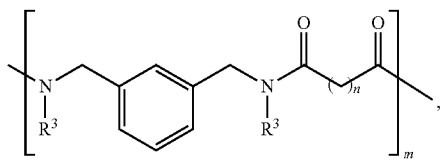
(III)

wherein m is a positive integer greater than 10;
wherein n is an integer from 1 to 6; and
wherein $R^3$ is H or C1-C4 alkyl.

17. The composition of claim 16, wherein n is 4.
18. The composition of claim 16, wherein $R^3$ is H.
19. The composition of claim 1, wherein the amide compound is a condensation product of meta-xylene diamine and adipic acid.
20. The composition of claim 1, wherein the amide compound has a structure represented by a formula:

E-(L-E)$_x$ wherein x is 0, 1, or 2;
wherein E has a structure of Formula IV or Formula V:

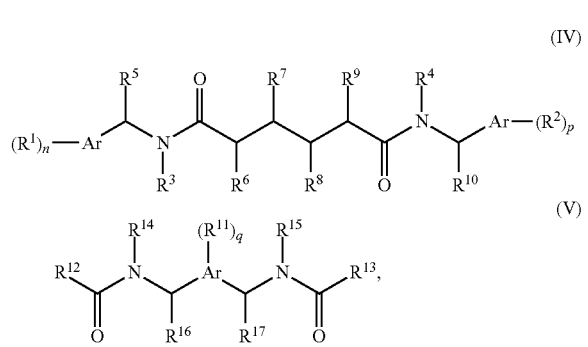

wherein L is a linking group of the formula —(O—$R^{21}$)$_z$—O—, —(NH—$R^{21}$)$_z$—NH—, —(NH—C(=O)$R^{22}$)$_t$—NH, —NH—$R^{25}$—NH(C(=O)$R^{26}$NHR$^{25}$NH)$_u$—, —O—$R^{23}$—O—($R^{24}$—C(=O)—O)$_s$—
where L is attached to a carbon atom of at least one Ar in Formula IV or where $R^{12}$ and/or $R^{13}$ of Formula V is L;
wherein Ar is aryl or heteroaryl;
wherein $R^1$, $R^2$, and $R^{11}$ are each independently, H, $C_1$-$C_{12}$ alkyl, $C_1$-$C_6$ alkoxy, $C_6$-$C_{20}$ aryloxy, hydroxy, $C_2$-$C_6$ alkenyl, $NR^{19}R^{20}$, acetyl, nitro, glyceryl, carbohydrate, —C(=O)H, L, or two $R^1$ or two $R^2$ groups can form a group of the formula —O—$R^{18}$—O;

wherein $R^3$, $R^4$, $R^{14}$, and $R^{15}$ are each H; $R^5$ to $R^0$ and $R^{16}$, and $R^{17}$ are each, independently, H or $C_1$-$C_3$ alkyl; $R^{12}$ and $R^{13}$ are each, independently, H, $C_1$-$C_6$ alkyl, $C_6$-$C_{20}$ aryl, $C_1$-$C_6$ alkoxy, or L;

wherein $R^{18}$ is $C_2$-$C_6$ alkyl; $R^{19}$ and $R^{20}$ are each, independently, H, $C_1$-$C_6$ alkyl, or $C_6$-$C_{20}$ aryl;

wherein $R^2$, and $R^{24}$ are each, independently, $C_1$-$C_6$ alkyl;

wherein $R^{22}$, $R^{23}$, $R^{25}$ and $R^{26}$ are each, independently, $C_1$-$C_6$ alkyl or $C_6$-$C_{20}$ aryl;

wherein n and p are independently 0 or an integer from 1 to 5;

wherein q is 0 or an integer from 1 to 4;

wherein s and z are independently 1, 2, or 3; and wherein t and u are independently 1 or 2.

21. The composition of claim 20, wherein the amide compound has a structure represented by a formula:

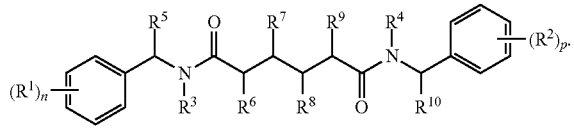

22. The composition of claim 21, where n and p are each 0, 1, or 2 and R1 and $R^2$ are each independently H, $C_1$-$C_4$ alkyl, hydroxy, $C_1$-$C_3$ alkoxy, or carbohydrate.

23. The composition of claim 22, wherein $R^1$ and $R^2$ are each independently H, methyl, ethyl, hydroxy, methoxy, ethoxy, or glucose.

24. The composition of claim 22, wherein $R^5$ to $R^{10}$ are each H.

25. The composition of claim 24, wherein $R^1$ and $R^2$ are each H.

26. The composition of claim 20, wherein the amide compound has a structure represented by a formula:

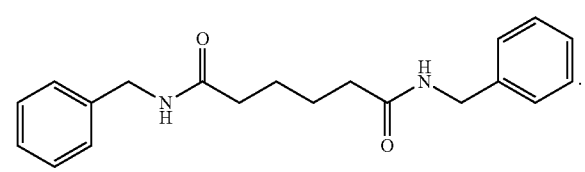 [SMILES: O=C(CCCCC(=O)NCc1ccccc1)NCc1ccccc1]

27. The composition of claim 20, wherein the amide compound has a structure represented by a formula:

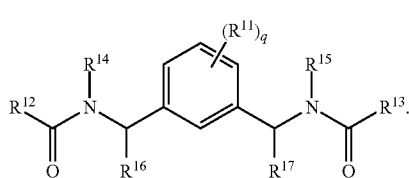

28. The composition of claim 27, wherein $R^{16}$ and $R^{17}$ are H.

29. The composition of claim 27, wherein each $R^{11}$ is independently H, $C_1$-$C_4$ alkyl, hydroxy, or $C_1$-$C_3$ alkoxy, or carbohydrate.

30. The composition of claim 29, wherein each $R^{11}$ is independently H, methyl, ethyl, hydroxy, methoxy, or ethoxy.

31. The composition of claim 20, wherein the amide compound has a structure represented by a formula:

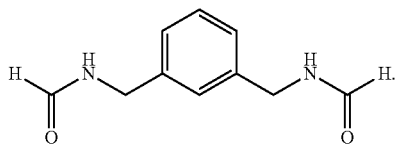

32. The composition of claim 1, wherein the colorant is selected such that an otherwise identical composition in the absence of the nonionic colorant harmonizer exhibits a catalyst deactivation factor (CDF) of greater than 0.25.
33. The composition of claim 1, wherein the colorant is selected such that an otherwise identical composition in the absence of the nonionic colorant harmonizer exhibits a CDF of greater than 0.5.
34. The composition of claim 1, wherein the colorant and the nonionic colorant harmonizer are selected such that the composition exhibits a catalyst deactivation factor* (CDF*) of less than about 0.75.
35. The composition of claim 1, wherein the colorant and the nonionic colorant harmonizer are selected such that the composition exhibits a CDF* of less than about 0.5.
36. The composition of claim 1, wherein the colorant and the nonionic colorant harmonizer are selected such that the composition exhibits a CDF* of less than about 0.25.
37. The composition of claim 1, wherein the colorant and the nonionic colorant harmonizer are selected such that the composition exhibits a CDF* of less than about 0.75, and an otherwise identical composition in the absence of the nonionic colorant harmonizer exhibits a CDF of greater than 0.25.
38. The composition of claim 1, having an OTR of less than about 0.03 cc/package/day.
39. The composition of claim 1, having an OTR of less than about 0.01 cc/package/day.
40. The composition of claim 1, wherein the colorant is a pigment.
41. The composition of claim 1, wherein the colorant is a dye.
42. The composition of claim 1, wherein the nonionic colorant harmonizer is an aliphatic ester having from 6 to 24 carbons.
43. The composition of claim 1, comprising:
a. polyethylene terephthalate or copolymer thereof;
b. the amide compound present in an amount of from about 1 to about 5 weight percent of the composition and selected from compounds having a structure of Formula III:

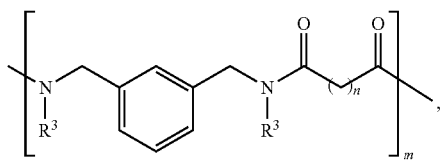

wherein m is a positive integer greater than 10;
wherein n is an integer from 1 to 6; and
wherein $R^3$ is H or C1-C4 alkyl,
c. cobalt in a positive oxidation state present in an amount of from about 30 to 150 ppm;
d. a visually effective amount of colorant, and
e. an aliphatic ester having from 6 to 24 carbons present in an amount of from about 1 to about 5 weight percent of the composition,
wherein the composition has an OTR of less than about 0.01 cc/package/day.
44. The composition of claim 1, comprising:
a. polyethylene terephthalate or copolymer thereof,
b. the amide compound present in an amount of from about 1 to about 5 weight percent of the composition and selected from compounds having a structure of $$E-(L-E)_x$$

wherein x is 0, 1, or 2;
wherein E has a structure of Formula IV or Formula V:

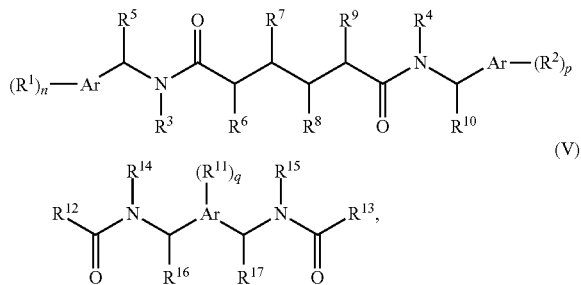

wherein L is a linking group of the formula —(O—$R^{21}$)$_z$—O—, —(NH—$R^{21}$)$_z$—NH—, —(NH—C(=O)$R^{22}$)$_t$—NH, —NH—$R^{25}$—NH(C(=O)$R^{26}$NHR$^{25}$NH)—, —O—$R^{23}$—O—($R^{24}$—C(=O)—O)$_s$— where L is attached to a carbon atom of at least one Ar in Formula IV or where $R^{12}$ and/or $R^3$ of Formula V is L;
wherein Ar is aryl or heteroaryl;
wherein $R^1$, $R^2$, and $R^{11}$ are each independently, H, $C_1$-$C_{12}$ alkyl, $C_1$-$C_6$ alkoxy, $C_6$-$C_{20}$ aryloxy, hydroxy, $C_2$-$C_6$ alkenyl, NR$^{19}$R$^{20}$, acetyl, nitro, glyceryl, carbohydrate, —C(=O)H, L, or two $R^1$ or two $R^2$ groups can form a group of the formula —O—$R^{18}$—O;
wherein $R^3$, $R^4$, $R^{14}$, and $R^5$ are each H; $R^5$ to $R^9$ and $R^{16}$, and $R^7$ are each, independently, H or $C_1$-$C_3$ alkyl; $R^{12}$ and $R^{13}$ are each, independently, H, $C_1$-$C_6$ alkyl, $C_6$-$C_{20}$ aryl, $C_1$-$C_6$ alkoxy, or L;
wherein $R^{18}$ is $C_2$-$C_6$ alkyl; $R^{19}$ and $R^{20}$ are each, independently, H, $C_1$-$C_6$ alkyl, or $C_6$-$C_{20}$ aryl;
wherein $R^2$, and $R^{24}$ are each, independently, $C_1$-$C_6$ alkyl;
wherein $R^{22}$, $R^{23}$, $R^{25}$ and $R^{26}$ are each, independently, $C_1$-$C_6$ alkyl or $C_6$-$C_{20}$ aryl;
wherein n and p are independently 0 or an integer from 1 to 5;
wherein q is 0 or an integer from 1 to 4;
wherein s and z are independently 1, 2, or 3; and
wherein t and u are independently 1 or 2;
c. cobalt in a positive oxidation state present in an amount of from about 30 to 150 ppm;
d. a visually effective amount of colorant, and
e. an aliphatic ester having from 6 to 24 carbons present in an amount of from about 1 to about 5 weight percent of the composition, wherein the composition has an OTR of less than about 0.01 cc/package/day.

45. The composition of claim 1, comprising:
a. polyethylene terephthalate or copolymer thereof;
b. the amide compound present in an amount of from about 1 to about 5 weight percent of the composition and selected from compounds having a structure of Formula I or Formula II:

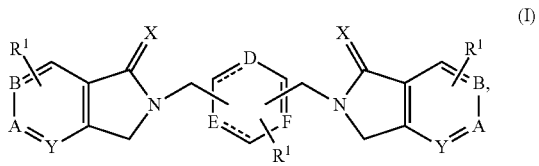

wherein each X is selected from the group consisting of O, S, and NH;
wherein each Y, each A, and each B are independently selected from the group consisting of N and CR$^1$;
wherein D, E, and F are independently selected from the group consisting of CH, N, O, and S;
wherein the symbol --- when used in conjunction with a bond line represents a single or a double bond; and
wherein each R$^1$ is independently selected from the group consisting of H, alkyl, aryl, electron withdrawing groups, electron releasing groups, and a transition metal,

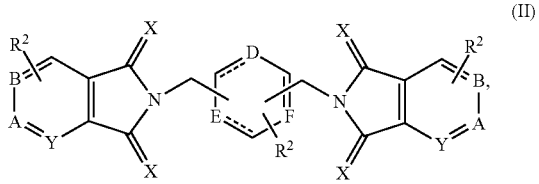

wherein each X is selected from the group consisting of O, S, and NH;
wherein each Y, each A, and each B are independently selected from the group consisting of N and CR$^2$;
wherein D, E, and F are independently selected from the group consisting of CH, N, O, and S;
wherein the symbol --- when used in conjunction with a bond line represents a single or a double bond; and
wherein each R$^2$ is independently selected from the group consisting of H, alkyl, aryl, electron withdrawing groups, electron releasing groups, and a transition metal,
c. cobalt in a positive oxidation state present in an amount of from about 30 to 150 ppm;
d. a visually effective amount of colorant, and
e. an aliphatic ester having from 6 to 24 carbons present in an amount of from about 1 to about 5 weight percent of the composition,
wherein the composition has an OTR of less than about 0.01 cc/package/day.

46. The composition of claim 43, wherein the colorant and the nonionic colorant harmonizer are selected such that an otherwise identical composition in the absence of the nonionic colorant harmonizer exhibits a CDF of greater than 0.25.

47. The composition of claim 43, wherein the colorant and the nonionic colorant harmonizer are selected such that the composition exhibits a CDF* of less than about 0.75.

48. The composition of claim 43, wherein the colorant and the nonionic colorant harmonizer are selected such that the composition exhibits a CDF* of less than about 0.75, and an otherwise identical composition in the absence of the nonionic colorant harmonizer exhibits a CDF of greater than 0.25 and a CDF* of less than about 0.75.

49. A method for making an oxygen scavenging polymer composition comprising the step of combining a base polymer; an N-allylic amide compound or N-benzylic amide compound; a transition metal in a positive oxidation state; a visually effective amount of colorant, and a nonionic colorant harmonizer present in an amount of from about 0.010 to about 10 weight percent of the composition;
wherein at least a portion of the polymer and at least a portion of the amide compound are covalently linked by one or more compatibilizing agents, and wherein when formed into an article the composition has an oxygen transmission rate (OTR) of less than about 0.1 cc/package/day.

50. The method of claim 49, wherein the nonionic colorant harmonizer is an aliphatic ester having from 6 to 24 carbons.

51. A method of preparing an article comprising the step of extruding a melted polymer composition, the composition comprising a base polymer; N-allylic- or N-benzylic amide compound present in an amount of from about 0.10 to about 10 weight percent of the composition; transition metal in a positive oxidation state, the metal present in an amount of from about 10 ppm to about 400 ppm; a visually effective amount of colorant, and a nonionic colorant harmonizer present in an amount of from about 0.010 to about 10 weight percent of the composition, wherein at least a portion of the polymer and at least a portion of the amide compound are covalently linked by one or more compatibilizing agents, thereby forming the article having an oxygen transmission rate (OTR) of less than about 0.1 cc/package/day.

52. The method of claim 51, wherein extrusion is injection molding.

53. The method of claim 51, wherein extrusion is sheet or film extrusion.

54. The method of claim 51, wherein the article is a bottle or a preform.

55. The method of claim 51, wherein the nonionic colorant harmonizer is an aliphatic ester having from 6 to 24 carbons.

56. A method of preparing an article comprising the step of blow molding a heated preform comprising a base polymer; N-allylic amide compound or N-benzylic amide compound present in an amount of from about 0.10 to about 10 weight percent of the composition; transition metal in a positive oxidation state, the metal present in an amount of from about 10 ppm to about 400 ppm; a visually effective amount of colorant; and a nonionic colorant harmonizer present in an amount of from about 0.010 to about 10 weight percent of the composition, wherein at least a portion of the polymer and at least a portion of the amide compound are covalently linked by one or more compatibilizing agents, thereby forming the article having an oxygen transmission rate (OTR) of less than about 0.1 cc/package/day.

57. The method of claim 56, wherein the nonionic colorant harmonizer is an aliphatic ester having from 6 to 24 carbons.

58. An article comprising a composition of a base polymer; an N-allylic amide compound or N-benzylic amide compound present in an amount of from about 0.10 to about 10 weight percent of the composition; a transition metal in a positive oxidation state, the metal present in an amount of from about 10 ppm to about 400 ppm; a visually effective amount of colorant; and a nonionic colorant harmonizer present in an amount of from about 0.010 to about 10 weight percent of the composition, wherein at least a portion of the polymer and at least a portion of the amide compound are covalently linked by one or more compatibilizing agents, and wherein the article has an oxygen transmission rate (OTR) of less than about 0.1 cc/package/day.

59. The article of claim 58, dimensioned as a vessel.

60. The article of claim 58, dimensioned as a film.

61. The article of claim 58, wherein the nonionic colorant harmonizer is an aliphatic ester having from 6 to 24 carbons.

* * * * *